United States Patent
Watanuki

(10) Patent No.: US 12,528,896 B2
(45) Date of Patent: Jan. 20, 2026

(54) FLUORINE-CONTAINING POLYMER AND METHOD OF PRODUCING SAME

(71) Applicant: AGC INC., Tokyo (JP)

(72) Inventor: Shun Watanuki, Chiyoda-ku (JP)

(73) Assignee: AGC INC., Tokyo (JP)

( * ) Notice: Subject to any disclaimer, the term of this patent is extended or adjusted under 35 U.S.C. 154(b) by 788 days.

(21) Appl. No.: 17/880,011

(22) Filed: Aug. 3, 2022

(65) Prior Publication Data
US 2022/0389132 A1     Dec. 8, 2022

Related U.S. Application Data

(63) Continuation of application No. PCT/JP2021/003747, filed on Feb. 2, 2021.

(30) Foreign Application Priority Data

Feb. 14, 2020  (JP) .................. 2020-023636
May 19, 2020   (JP) .................. 2020-087582

(51) Int. Cl.
C08F 36/20      (2006.01)
C08F 14/26      (2006.01)

(52) U.S. Cl.
CPC .............. *C08F 36/20* (2013.01); *C08F 14/26* (2013.01)

(58) Field of Classification Search
CPC .... C08F 14/185; C08F 36/20; C08F 214/182; C08F 236/20
USPC ........................................ 526/252
See application file for complete search history.

(56) References Cited

U.S. PATENT DOCUMENTS

| | | | | |
|---|---|---|---|---|
| 2005/0234206 A1* | 10/2005 | Takebe | .................... | C08F 14/18 526/252 |
| 2007/0083021 A1* | 4/2007 | Eda | ....................... | C08F 236/20 526/252 |
| 2010/0240791 A1 | 9/2010 | Sugiyama et al. | | |
| 2014/0303334 A1 | 10/2014 | Goto et al. | | |
| 2019/0389983 A1 | 12/2019 | Ohkura et al. | | |
| 2021/0284780 A1 | 9/2021 | Mitchell et al. | | |

FOREIGN PATENT DOCUMENTS

| | | |
|---|---|---|
| CN | 103906770 A | 7/2014 |
| JP | 2006-022304 A | 1/2006 |
| JP | 2020-504226 A | 2/2020 |
| WO | WO 2009/096342 A1 | 8/2009 |
| WO | WO 2018/164147 A1 | 9/2018 |

OTHER PUBLICATIONS

International Search report issued Apr. 6, 2021 in PCT/JP2021/003747 filed on Feb. 2, 2021, 3 pages.

Brown et al., "Glass Transition Temperatures of Several Fluorine Containing Polymers", Journal of Polymer Science, 1969, vol. 7, Issue 4, pp. 601-608, https://doi.org/10.1002/pol.1969.160070402.

Yoshiharu Tatsukami, Yutaka Kometani, Yasuhiro Oda, Masayasu Tomoda: "Synthesis of the Ethylene-Hexafluoropropene Copolymers by High Pressure Copolymerization and Their Elastic Properties", Journal of the Chemical Society of Japan, Chemical Society of Japan. Tokyo., JP, vol. 1980, No. 1, Jan. 10, 1980 (Jan. 10, 1980), pp. 112-120, https://doi.org/10.1246/nikkashi_1980.112. (with English Abstract and English language Table 3).

* cited by examiner

*Primary Examiner* — Fred M Teskin
(74) *Attorney, Agent, or Firm* — Oblon, McClelland, Maier & Neustadt, L.L.P.

(57) ABSTRACT

A fluorine-containing polymer has a fluorine content of 50% by mass or more, a degree of unsaturation of 0.1 mEq/g or more, and a glass transition temperature of −20° C. or higher, and the relationship between the maximum value $E^*1$ of the complex elastic modulus in the range of from −50° C. to (glass transition temperature −10° C.) and the minimum value $E^*2$ of the complex elastic modulus in the range of from (glass transition temperature +10° C.) to 250° C. satisfies the following inequality: $E^*2/E^*1 \leq 0.01$.

7 Claims, No Drawings

FLUORINE-CONTAINING POLYMER AND METHOD OF PRODUCING SAME

CROSS-REFERENCE TO RELATED APPLICATIONS

This application is a Continuation Applications of International Application No. PCT/JP2021/003747, filed Feb. 2, 2021, the disclosure of which is incorporated herein by reference in its entirety. Further, this application claims priority from Japanese Patent Application No. 2020-023636, filed Feb. 14, 2020, and Japanese Patent Application No. 2020-087582, filed May 19, 2020, the disclosures of which are incorporated herein by reference in their entirety.

TECHNICAL FIELD

The present disclosure relates to a fluorine-containing polymer and a method of producing the same.

BACKGROUND ART

Radical polymerization reactions are widely used industrially, since the reactions have excellent versatility in monomers, and can be easily carried out even in polar media such as water.

In cases in which haloolefins, especially fluoroolefins, are used as monomers, a haloolefin polymer can be synthesized. Haloolefin polymers are useful as raw materials of low reactivity solvents having a carbon-carbon double bond, low reactivity solvents, heating media, pharmaceutical/agrochemical intermediates, fire extinguishing agents, surfactants, surface treating agents, low-friction sliding agents, mold lubricants, resin molding additives, chemical-resistant greases, low refractive index materials, low dielectric constant materials, heat-resistant elastomers, thermoplastic elastomers, flame retardant materials, chemical-resistant ionomers, photoresist materials, and the like.

A known method of polymerizing haloolefin is described in Patent Document 1. Patent Document 1 discloses a radical polymerization method in which a specific haloolefin undergoes radical polymerization in the presence of a specific organotellurium compound to produce a haloolefin polymer or copolymer. This method is called a TERP (organotellurium-mediated living radical polymerization) method.

PRIOR ART DOCUMENT

Patent Document

Patent Document 1: WO 2018/164147

SUMMARY OF INVENTION

Technical Problem

Cured products of fluorine-containing polymers are excellent in dielectric properties, and thus are used in various electronic parts and the like as low dielectric materials. In particular, the recent development of high-speed communication technology has been accompanied by an increase in demand for low-dielectric materials that can reduce the loss of high-frequency signals. The inventor has considered developing fluorine-containing polymers as laminatable materials such as interlayer insulating films for multilayer printed wiring boards. Multilayer printed wiring boards are formed by repeating arrangement of metal wiring and lamination of interlayer insulating films. Thus, the materials of the interlayer insulating films are required to be capable of being laminated via heat curing. In addition, the interlayer insulating films are required to have high dimensional accuracy in order to ensure insulating properties among wirings. To achieve such laminating properties and dimensional accuracy, the materials of the interlayer insulating films are desired to have high curability. However, there have been no findings on a method capable of providing a fluorine-containing polymer that is excellent in both curability and low dielectric properties of the cured product.

For example, while the fluorine-containing polymer obtained by the method described in Patent Document 1 can be used as a curable material by introducing a curable group thereto, since the fluorine-containing polymer has a linear molecular chain, the cured product thereof has low crosslink density and is unlikely to show sufficient curability.

In view of such a situation, an object of the present disclosure is to provide a fluorine-containing polymer having excellent curability and low dielectric properties after being cured, and a method of producing the fluorine-containing polymer.

Solution to Problem

Means for solving the foregoing problems include the following aspects.

[1] A fluorine-containing polymer, having a fluorine content of 50% by mass or more, a degree of unsaturation of 0.1 mEq/g or more, and a glass transition temperature of −20° C. or higher,
  wherein a relationship between a maximum value $E^*1$ of a complex elastic modulus in a range of from −50° C. to (glass transition temperature −10° C.) and a minimum value $E^*2$ of the complex elastic modulus in a range of from (glass transition temperature +10° C.) to 250° C. satisfies the following inequality:

$$E^*2/E^*1 \leq 0.01.$$

[2] The fluorine-containing polymer according to [1], having a polydispersity index of 2.0 or less.

[3] The fluorine-containing polymer according to [1] or [2], having a weight average molecular weight of from 1,000 to 1,000,000.

[4] The fluorine-containing polymer according to any one of [1] to [3], which is:
  a polymer of a compound represented by the following Formula (1); or
  a copolymer of the compound represented by the following Formula (1) and a compound that has a reactive carbon-carbon double bond and that is different from the compound represented by Formula (1):

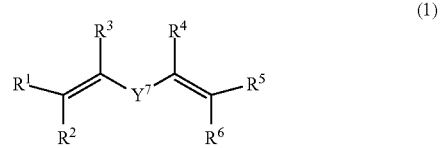

(1)

wherein, in Formula (1):
  $Y^7$ represents a divalent organic group having at least one fluorine atom, each of $R^1$ to $R^6$ independently represents a hydrogen atom, a fluorine atom, a chlorine atom, a bromine atom, an iodine atom, or an organic group having 1 to 5 carbon atoms, and each of $R^1$ and $R^3$, $R^4$ and $R^5$, $R^2$ and $Y^7$, and $R^6$ and $Y^7$ may be independently linked to each other to form a ring structure.

[5] The fluorine-containing polymer according to [4], wherein a fluorine content of the compound represented by Formula (1) is 20% by mass or more.

[6] The fluorine-containing polymer according to [4] or [5], wherein $Y^7$ in Formula (1) is a fluoroalkylene group having from 1 to 60 carbon atoms, a fluoropolyether group having from 1 to 60 carbon atoms, or a fluoroarylene group having from 1 to 60 carbon atoms.

[7] The fluorine-containing polymer according to any one of [4] to [6], wherein the compound represented by Formula (1) includes at least one selected from the group consisting of a divinylfluoroalkane having from 5 to 64 carbon atoms, a divinylfluoropolyether having from 5 to 64 carbon atoms, and a divinylfluoroarylene having from 5 to 64 carbon atoms.

[8] A method of producing the fluorine-containing polymer according to any one of [1] to [7], the method including polymerizing compounds having at least two reactive carbon-carbon double bonds:

in the presence of an ionic catalyst represented by the following Formula (2), which includes an anion and a counter cation, and a compound having a partial structure represented by the following Formula (3), or in the presence of at least one compound selected from the group consisting of a compound represented by the following Formula (4) and a compound represented by the following Formula (5):

$$A^+B^- \tag{2}$$

wherein, in Formula (2):

$A^+$ represents a cation including at least one element selected from the group consisting of nitrogen and phosphorus, an alkali metal ion, or a proton, and $B^-$ represents a monovalent anion including at least one element selected from the group consisting of iodine, nitrogen, and sulfur:

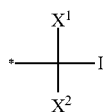

(3)

wherein, in Formula (3):

\* represents a bonding site that is bonded to an organic group, and each of $X^1$ and $X^2$ independently represents a hydrogen atom, a fluorine atom, a chlorine atom, or $-CX^3X^4X^5$, wherein each of $X^3$ to $X^5$ independently represents a hydrogen atom, a fluorine atom, or a chlorine atom:

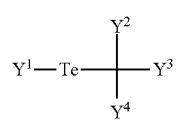

(4)

wherein, in Formula (4):

$Y^1$ represents an unsubstituted alkyl group having from 1 to 8 carbon atoms, a substituted alkyl group having from 1 to 8 carbon atoms, an unsubstituted aryl group having from 3 to 12 carbon atoms, or a substituted aryl group having from 3 to 16 carbon atoms, each of $Y^2$ and $Y^3$ independently represents a hydrogen atom, or a substituted or unsubstituted alkyl group having from 1 to 8 carbon atoms, and $Y^4$ represents a hydrogen atom, an unsubstituted alkyl group having from 1 to 8 carbon atoms, a substituted alkyl group having from 1 to 8 carbon atoms, an unsubstituted aryl group having from 3 to 12 carbon atoms, a substituted aryl group having from 3 to 16 carbon atoms, an acyl group having from 2 to 8 carbon atoms, an amide group having from 2 to 8 carbon atoms, an oxycarbonyl group, or a cyano group:

$$Y^5-Te-Te-Y^6 \tag{5}$$

wherein, in Formula (5):

each of $Y^5$ and $Y^6$ independently represents an unsubstituted alkyl group having from 1 to 8 carbon atoms, a substituted alkyl group having from 1 to 8 carbon atoms, an unsubstituted aryl group having from 3 to 12 carbon atoms, or a substituted aryl group having from 3 to 16 carbon atoms.

[9] The method of producing a fluorine-containing polymer according to [8], wherein the compound having at least two reactive carbon-carbon double bonds includes a compound represented by the following Formula (1):

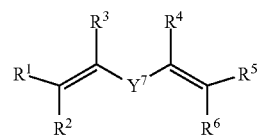

(1)

wherein, in Formula (1):

$Y^7$ represents a divalent organic group having at least one fluorine atom, each of $R^1$ to $R^6$ independently represents a hydrogen atom, a fluorine atom, a chlorine atom, a bromine atom, an iodine atom, or an organic group having from 1 to 5 carbon atoms, and each of $R^1$ and $R^3$, $R^4$ and $R^5$, $R^2$ and $Y^7$, and $R^6$ and $Y^7$ may be independently linked to each other to form a ring structure.

[10] The method of producing a fluorine-containing polymer according to [9], the method including copolymerizing the compound represented by Formula (1) and a compound that has a reactive carbon-carbon double bond and that is different from the compound represented by Formula (1).

Advantageous Effects of Invention

According to the present disclosure, a fluorine-containing polymer having excellent curability and low dielectric properties after being cured, and a method of producing the fluorine-containing polymer are provided.

DESCRIPTION OF EMBODIMENTS

Embodiments for carrying out the invention will be described below in detail. However, the invention is not limited to the following embodiments. In the following embodiments, components (including elemental steps, etc.) thereof are not essential unless otherwise specified. The same applies to numerical values and ranges, which do not limit the invention.

In the present disclosure, the term "step" encompasses an independent step separated from other steps as well as a step that is not clearly separated from other steps, as long as a purpose of the step can be achieved.

In the present disclosure, a numerical range specified using "(from) . . . to . . . " represents a range including the numerical values noted before and after "to" as a minimum value and a maximum value, respectively.

In the present disclosure, each component may include plural substances corresponding to the component. In a case in which plural substances corresponding to a component are present in a composition, the amount or content of the component in the composition means the total amount or content of the plural substances present in the composition unless otherwise specified.

An aryl group means a monovalent group corresponding to a residue obtained by removing one hydrogen atom bonded to one of the carbon atoms that form the aromatic ring of an aromatic compound. The term "aryl group" is used as a general term for both homoaryl groups that are derived from carbocyclic compounds, and heteroaryl groups that are derived from heterocyclic compounds.

An arylene group means a divalent group corresponding to a residue obtained by removing one hydrogen atom bonded to one of the carbon atoms of an aryl group.

As used herein, a reactive carbon-carbon double bond means a carbon-carbon double bond that can undergo various types of reactions as an olefin, and does not include aromatic double bonds.

As used herein, the number of carbons of a compound or a component thereof means, when the compound or the component thereof has a substituent, a number that includes the number of carbons of the substituent.

As used herein, (meth)acrylic acid is a general term for acrylic acid and methacrylic acid. (Meth)acrylate is a general term for acrylate and methacrylate. (Meth)acrylamide is a general term for acrylamide and methacrylamide.

A "polymer" and an "oligomer" are compounds that include polymerized monomers. Therefore, a "polymer" and an "oligomer" have plural structural units.

As used herein, unless otherwise stated, the phrase "polymerizing Compound A" includes both cases where only Compound A is polymerized and where Compound A and another compound are polymerized. Further, the phrase "polymerizing Compound A and Compound B" includes both cases where only Compounds A and B are polymerized and where Compound A, Compound B, and another compound are polymerized. Here, Compound A and Compound B each represent any compound described herein having a reactive carbon-carbon double bond in a molecule thereof. Further, unless otherwise stated, a polymer described in the present disclosure may be a homopolymer of one compound, or a copolymer of two or more compounds.

The articles "a" and "an" are used to refer to elements described herein. This is done merely for convenience and to give a general sense of the scope of the invention. The articles "a" and "an" should be read to include "one or more" of elements to which they refer, unless it is clear from the context that such a meaning is not intended. For example, when a single item is described herein, more than one item may be used in place of the single item. Similarly, where more than one of an item is described herein, a single one of the item may be substituted for that more than one item.

<Fluorine-Containing Polymer>

The fluorine-containing polymer according to the present disclosure (hereinafter, also simply referred to as a "fluorine-containing polymer") has a fluorine content of 50% by mass or more, a degree of unsaturation of 0.1 mEq/g or more, and a glass transition temperature (Tg) of −20° C. or higher, and the relationship between the maximum value $E*1$ of the complex elastic modulus in the range of from −50° C. to (glass transition temperature −10° C.) and the minimum value $E*2$ of the complex elastic modulus in the range of from (glass transition temperature +10° C.) to 250° C. satisfies the following inequality: $E*2/E*1 \leq 0.01$.

The fluorine-containing polymer according to the present disclosure can be used as a curable material. The fluorine-containing polymer according to the present disclosure is a polymer obtained by polymerization of a monomer having a reactive carbon-carbon double bond, for example, a compound that is an oligomer and has an unsaturated bond. The fluorine-containing polymer according to the present disclosure has a degree of unsaturation of 0.1 mEq/g or more, and thus the use of the fluorine-containing polymer to prepare a cured product enables to obtain a cured product with high crosslink density. Furthermore, since the fluorine-containing polymer according to the present disclosure has a glass transition temperature of −20° C. or higher, the cured product can achieve good hardness, which, in combination with the high crosslink density as described above, provides a cured product having an excellent mechanical strength. In addition, the fluorine-containing polymer according to the present disclosure has a fluorine content of 50% by mass or more, and thus enables to obtain a cured product with high fluorine content and excellent low dielectric properties. In addition, the fluorine-containing polymer according to the present disclosure satisfies the relationship of $E*2/E*1 \leq 0.01$ as described above. In usual, polymers that do not melt at a temperature in a range of up to 250° C. do not satisfy the relationship of $E*2/E*1 \leq 0.01$. The fact that the fluorine-containing polymer satisfies the relationship of $E*2/E*1 \leq 0.01$ can be considered as an indicator of the meltability of the fluorine-containing polymer. Satisfaction of the relationship described above by the fluorine-containing polymer can enable suitable melt molding and desirable use as a curable material. Based on the characteristics as described above, the fluorine-containing polymer according to the present disclosure is particularly useful as a curable material for use in applications requiring excellent curability and low dielectric properties.

The fluorine content of the fluorine-containing polymer is 50% by mass or more, and the fluorine content is preferably high from the viewpoint of lowering the dielectric properties of the cured product. For example, the fluorine content of the fluorine-containing polymer is preferably 55% by mass or more, and more preferably 60% by mass or more. The fluorine content of the fluorine-containing polymer may be 76% by mass or less. From these viewpoints, the fluorine content of the fluorine-containing polymer is preferably from 50% by mass to 76% by mass, more preferably from 55% by mass to 76% by mass, and further preferably from 60% by mass to 76% by mass.

The fluorine content of the compound is defined as a value determined by combustion-ion chromatography.

Note that the fluorine content of the compound can also be determined by nuclear magnetic resonance (NMR) with an error range of, for example, about ±10%.

The degree of unsaturation of the fluorine-containing polymer is 0.1 mEq/g or more. From the viewpoint of increasing the number of crosslinking points and further improving the curability, the degree of unsaturation of the fluorine-containing polymer is preferably 0.3 mEq/g or more, more preferably 0.4 mEq/g or more, and further preferably 0.5 mEq/g or more, or may be 1.0 mEq/g or more, or may be 1.5 mEq/g or more. The upper limit of the degree of unsaturation of the fluorine-containing polymer is not particularly limited, and is preferably adjusted depending on the desired physical properties of the cured product. For example, the degree of unsaturation of the fluorine-containing polymer may be 10 mEq/g or less.

The degree of unsaturation of the fluorine-containing polymer can be adjusted, for example, by the type of the monomer used as a raw material, and the polymerization method.

The degree of unsaturation of the fluorine-containing polymer in the present disclosure is measured by a method according to the micro-titration method specified in JIS K 1557-3:2007 (corresponding international standard: ISO 17710:2002). Specifically, the measurement is carried out by the following method.

As reagents, a 0.05 mol/L mercury(II) acetate solution in methanol ($Hg(C_2H_3O_2)_2$), a 0.05 mol/L potassium hydroxide solution in methanol, a 0.05 mol/L hydrochloric acid solution in methanol, sodium bromide, and methanol are prepared. Two milliliters of the mercury(II) acetate solution are added to a sample solution in tetrahydrofuran with stirring, and then the solution is left to stand for 30 minutes. Fifty milliliters of methanol are added, followed by addition of 0.25 g of sodium bromide. Titration is performed with a potassium hydroxide solution using an automatic titrator. Similarly but without addition of the sample, a blank test is performed. For correction of the results, a sample solution is prepared using a system without mercury(II) acetate, and the acidity or basicity of the sample is measured using a potassium hydroxide solution or a hydrochloric acid solution. The degree of unsaturation of the sample is determined by the following equation:

$$U=[(V_S-V_B)\times c(KOH)/m]-A+B$$

U: Degree of unsaturation (mEq/g)
$V_S$: Volume (mL) of 0.05 mol/L potassium hydroxide solution required for sample solution
$V_B$: Volume (mL) of 0.05 mol/L potassium hydroxide solution required for blank test
c(KOH): Concentration (mEq/mL) of potassium hydroxide solution in methanol
m: Mass of sample (g)
A: Acidity (mEq/g)
B: Basicity (mEq/g)

Note that the degree of unsaturation of the fluorine-containing polymer can also be determined by nuclear magnetic resonance (NMR) with an error range of, for example, about ±10%.

The number of the reactive carbon-carbon double bond in the fluorine-containing polymer is not particularly limited as long as the fluorine-containing polymer satisfies the degree of unsaturation described above. The average number of the reactive carbon-carbon double bond contained per one fluorine-containing polymer molecule is preferably 2 or more, more preferably 3 or more, and further preferably 4 or more from the viewpoint of increasing the crosslink density to obtain good mechanical strength and dielectric properties. The average number of the reactive carbon-carbon double bond contained per one fluorine-containing polymer molecule may be 10 or less from the viewpoint of efficiently reducing gelation during the process of producing the fluorine-containing polymer. From these viewpoints, the average number of reactive carbon-carbon double bond contained per one fluorine-containing polymer molecule is preferably from 2 to 10, more preferably from 3 to 10, and further preferably from 4 to 10.

The glass transition temperature of the fluorine-containing polymer is −20° C. or higher. The glass transition temperature of the fluorine-containing polymer is preferably −10° C. or higher, more preferably −5° C. or higher, and further preferably 0° C. or higher from the viewpoint of the mechanical strength of the cured product. The upper limit of the glass transition temperature is not particularly limited, and may be, for example, 150° C. or lower from the viewpoint of melt molding properties. The glass transition temperature is measured by differential scanning calorimetry (DSC).

In the fluorine-containing polymer, the relationship between the maximum value E*1 of the complex elastic modulus in the range of from −50° C. to (glass transition temperature −10° C.) and the minimum value E*2 of the complex elastic modulus in the range of from (glass transition temperature +10° C.) to 250° C. satisfies the following inequality: E*2/E*1≤0.01. As described above, the complex elastic modulus of the fluorine-containing polymer that satisfies the relationship of E*2/E*1≤0.01 is indicative of meltability of the fluorine-containing polymer. E*2/E*1 may be 0.001 or less, or may be 0.0001 or less.

The complex elastic modulus is measured according to JIS K 7244-1:1998 (corresponding to ISO 6721-1:1994), JIS K 7244-4:1999 (corresponding to ISO 6721-4:1994), and JIS K 7244-6:1999 (corresponding to ISO 6721-6:1996).

The minimum value E*2 of the complex elastic modulus of the fluorine-containing polymer in the range of from (glass transition temperature +10° C.) to 250° C. is preferably 10,000,000 Pa or less, more preferably 1,000,000 Pa or less, further preferably 100,000 Pa or less, and particularly preferably 10,000 Pa or less, from the viewpoint of ease of molding. The lower limit of E*2 is not particularly limited, and may be 1 Pa or more.

The range of the maximum value E*1 of the complex elastic modulus of the fluorine-containing polymer in the range of from −50° C. to (glass transition temperature −10° C.) is not particularly limited as long as the relationship of E*2/E*1≤0.01 is satisfied.

The weight average molecular weight (Mw) of the fluorine-containing polymer is not particularly limited, and is preferably 1,000 or more, more preferably 2,000 or more, and further preferably 5,000 or more, from the viewpoint of mechanical strength and low dielectric loss properties. The weight average molecular weight of the fluorine-containing polymer is preferably 1,000,000 or less, more preferably 500,000 or less, and further preferably 200,000 or less, from the viewpoint of fluidity during melt molding. From these viewpoints, the weight average molecular weight of the fluorine-containing polymer is preferably from 1,000 to 1,000,000, more preferably from 2,000 to 500,000, and further preferably from 5,000 to 200,000.

The number average molecular weight (Mn) of the fluorine-containing polymer is not particularly limited, and is preferably 500 or more, more preferably 1,000 or more, and further preferably 2,500 or more, from the viewpoints of mechanical strength and low dielectric loss properties. The number average molecular weight is preferably 500,000 or less, more preferably 250,000 or less, and further preferably 100,000 or less, from the viewpoint of fluidity during melt molding. From these viewpoints, the number average molecular weight of the fluorine-containing polymer is preferably from 500 to 500,000, more preferably from 1,000 to 250,000, and further preferably from 2,500 to 100,000.

The number average molecular weight (Mn) and the weight average molecular weight (Mw) in the present disclosure are determined by SEC (Size Exclusion Chromatography) measurement, and polystyrene is used as a reference material for molecular weight conversion.

The polydispersity index of the fluorine-containing polymer is preferably 2.0 or less, more preferably 1.8 or less, further preferably 1.6 or less, particularly preferably 1.4 or less, and extremely preferably 1.3 or less. The polydispersity index within these ranges results in reduced variation in the curability, allowing for obtaining cured products with high uniformity. The lower limit value of the polydispersity index is 1.0 by definition.

The polydispersity index (PD) is an indicator of molecular weight distribution, and is determined by the following equation:

{PD=$Mw$(weight average molecular weight)/$Mn$ (number average molecular weight)}

The polydispersity index can be adjusted within the ranges described above by using a highly-controlled polymerization method. Examples of the highly-controlled method include the production method A and the production method B described below.

Preferably, the fluorine-containing polymer can be dissolved in a solvent in which the monomer used as a raw material can be dissolved. The fact that the fluorine-containing polymer can be dissolved in such a solvent indicates that the fluorine-containing polymer has not undergone gelation. By avoiding gelation, the fluorine-containing polymer can be suitably used as a molding material. Gelation means a state in which the weight average molecular weight (Mw) of the compound diverges to infinity. Compounds that have undergone gelation have a three-dimensional network structure that is insoluble and unmeltable. Preferably, the fluorine-containing polymer can be dissolved in, for example, 1H-perfluorohexane, benzotrifluoride, or tetrahydrofuran. The phrase "can be dissolved" means that 1 g or more of the fluorine-containing polymer can be dissolved in 100 mL of the solvent.

The fluorine-containing polymer is a polymer of a compound having a reactive carbon-carbon double bond. Here, the phrase "compound having a reactive carbon-carbon double bond" refers to a component of the fluorine-containing polymer to be obtained, typically a monomer. The fluorine-containing polymer may be a polymer of one monomer, or a copolymer of two or more monomers. The copolymer may be a block copolymer, a random copolymer, or an alternating copolymer.

The fluorine content of the compound having a reactive carbon-carbon double bond is preferably 20% by mass or more, and from the viewpoint of lowering the dielectric properties of the cured product to be obtained, the fluorine content is more preferably 30% by mass or more, and further preferably 40% by mass or more. The fluorine content of the compound having a reactive carbon-carbon double bond may be 76% by mass or less from the viewpoint of molding properties such as solubility to solvents.

From the viewpoints described above, the fluorine content of the compound having a reactive carbon-carbon double bond is preferably from 20% by mass to 76% by mass, more preferably from 30% by mass to 76% by mass, and further preferably from 40% by mass to 76% by mass.

Preferably, the fluorine-containing polymer is a polymer of a compound having at least two reactive carbon-carbon double bonds. Polymerization of a compound having at least two reactive carbon-carbon double bonds enables introduction of many branching points and crosslinking points, and thus, when the obtained fluorine-containing polymer is further cured, it can form a denser crosslinked structure. The number of reactive carbon-carbon double bonds in the compound having a reactive carbon-carbon double bond may be, for example, from 2 to 6, from 2 to 4, or 2 to 3.

In one aspect, the fluorine-containing polymer may be:
a polymer of a compound represented by the following Formula (1); or
a copolymer of the compound represented by the following Formula (1) and a compound that has a reactive carbon-carbon double bond and that is different from the compound represented by Formula (1).

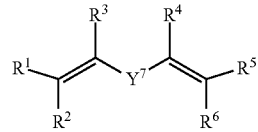

(1)

In Formula (1), $Y^7$ represents a divalent organic group having at least one fluorine atom. Each of $R^1$ to $R^6$ independently represents a hydrogen atom, a fluorine atom, a chlorine atom, a bromine atom, an iodine atom, or an organic group having from 1 to 5 carbon atoms. Each of $R^1$ and $R^3$, $R^4$ and $R^5$, $R^2$ and $Y^7$, and $R^6$ and $Y^7$ may be independently linked to each other to form a ring structure.

In Formula (1), the number of carbons of $Y^7$ is not particularly limited, and is preferably from 1 to 60, and more preferably from 1 to 40. The number of carbons may be from 2 to 30, or from 3 to 20.

$Y^7$ in Formula (1) may be, for example, a fluoroalkylene group having from 1 to 60 carbon atoms, a fluoropolyether group having from 1 to 60 carbon atoms, or a fluoroarylene group having from 1 to 60 carbon atoms. In particular, $Y^7$ is preferably a perfluoroalkylene group having from 1 to 60 carbon atoms, a perfluoropolyether group having from 1 to 60 carbon atoms, or a perfluoroarylene group having from 1 to 60 carbon atoms.

The organic group having from 1 to 5 carbon atoms represented by each of $R^1$ to $R^6$ may be, for example, a substituted or unsubstituted alkyl group having from 1 to 5 carbon atoms. The substituent may be, for example, a carbonyl group.

Each of $R^1$ to $R^6$ is independently preferably a hydrogen atom, a fluorine atom, or a methyl group from the viewpoint of lowering the dielectric loss.

From the viewpoint of polymerizability, it is preferable that at least one selected from the group consisting of the atoms bonded to the atoms at both ends of $Y^7$, and $R^1$ to $R^6$, is a fluorine atom. Here, the atoms at both ends of $Y^7$ refer to the atoms in $Y^7$ that are bonded to the two double bonds of Formula (1).

In Formula (1), each of $R^1$ and $R^3$, $R^4$ and $R^5$, $R^2$ and $Y^7$, and $R^6$ and $Y^7$ may be independently linked to each other to form a ring structure. The expression that "$R^1$ and $R^3$ are linked to each other to form a ring structure" means that any atom contained in $R^1$ and any atom contained in $R^3$ are linked to each other to form a ring structure. The same applies to the case where $R^4$ and $R^5$, $R^2$ and $Y^7$, or $R^6$ and $Y^7$ are linked to each other to form a ring structure.

The compound represented by Formula (1) may be a compound having a ring structure, such as maleic anhydride or itaconic anhydride.

The fluorine content of the compound represented by Formula (1) is preferably 20% by mass or more, and from the viewpoint of the low dielectric properties of the cured product to be obtained, the fluorine content is more preferably 30% by mass or more, and further preferably 40% by mass or more. The fluorine content of the compound represented by Formula (1) may be 76% by mass or less.

From the viewpoints described above, the fluorine content of the compound represented by Formula (1) is preferably from 20% by mass to 76% by mass, more preferably from 30% by mass to 76% by mass, and further preferably from 40% by mass to 76% by mass.

The compound represented by Formula (1) may be at least one selected from the group consisting of divinylfluoroalkane having from 5 to 64 carbon atoms, divinylfluoropolyether having from 5 to 64 carbon atoms, and divinylfluoroarylene having from 5 to 64 carbon atoms. In particular, at least one selected from the group consisting of divinylperfluoroalkane having from 5 to 64 carbon atoms, divinylperfluoropolyether having from 5 to 64 carbon atoms, and divinylperfluoroarylene having from 5 to 64 carbon atoms is preferable. One type of the compound represented by Formula (1) may be used singly, or two or more types thereof may be used in combination.

Specific examples of the compound represented by Formula (1) include the following exemplary compounds. Particularly preferred compounds include 1,6-divinyldodecafluorohexane and 1,4-divinyloctafluorobutane. In the following exemplary compounds, * means that the substitution position of the substituent on the aromatic ring is not limited.

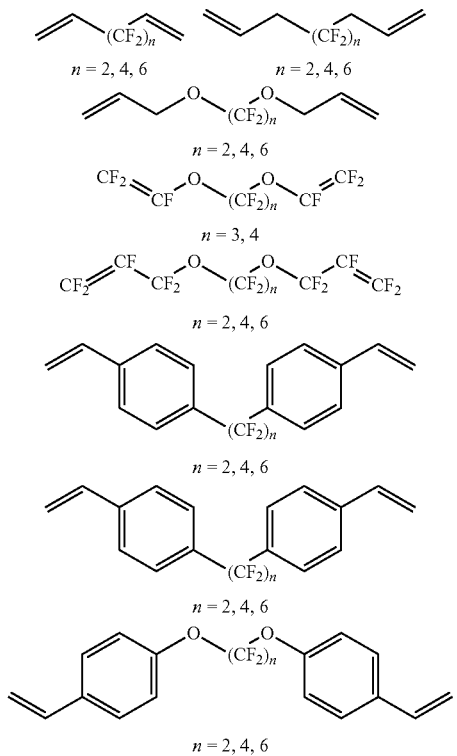

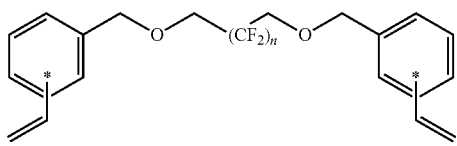

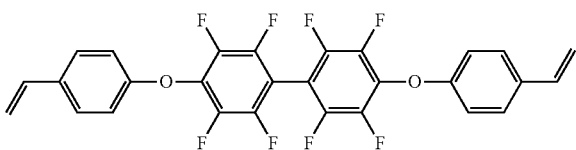

Preferred examples of the compound represented by Formula (1) also include the maleimide compounds illustrated below.

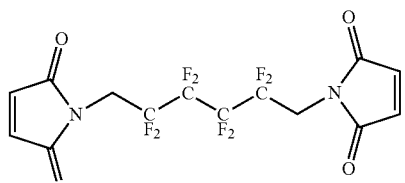

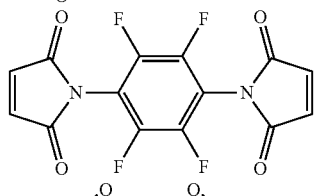

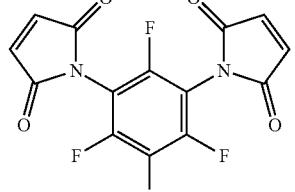

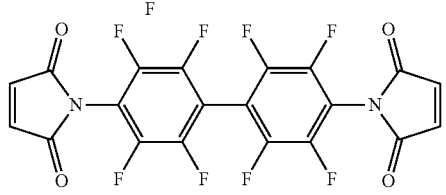

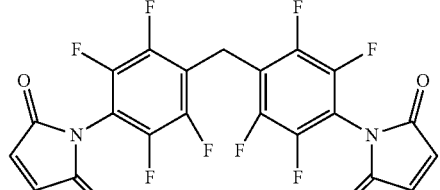

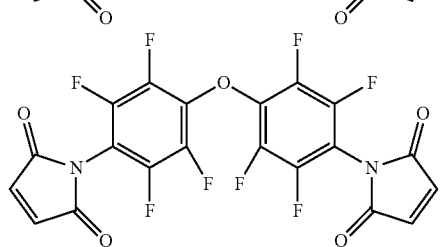

-continued

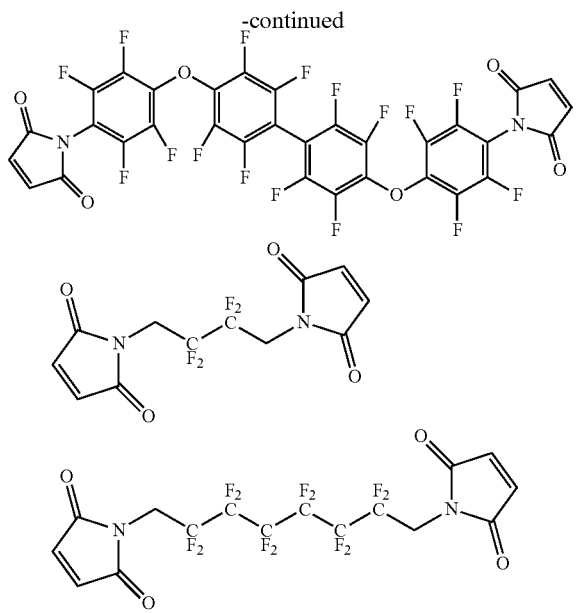

The compound used for copolymerization that has a reactive carbon-carbon double bond and that is different from the compound represented by Formula (1) is not particularly limited as long as it can be copolymerized with the compound represented by Formula (1). Examples thereof include a (meth)acrylic ester monomer, such as methyl (meth)acrylate, ethyl (meth)acrylate, propyl (meth)acrylate, butyl (meth)acrylate, octyl (meth)acrylate, or lauryl (meth)acrylate; an unsaturated monomer containing a cycloalkyl group, such as cyclohexyl (meth)acrylate, methylcyclohexyl (meth)acrylate, isobornyl (meth)acrylate, or cyclododecyl (meth)acrylate; an unsaturated monomer containing a carboxyl group, such as (meth)acrylic acid, maleic acid, fumaric acid, itaconic acid, citraconic acid, crotonic acid, maleic anhydride, or itaconic anhydride; a tertiary amine-containing unsaturated monomer, such as N,N-dimethylaminopropyl (meth)acrylamide, N,N-dimethylaminoethyl (meth)acrylamide, 2-(dimethylamino)ethyl (meth)acrylate, or N,N-dimethylaminopropyl (meth)acrylate; an unsaturated monomer containing a quaternary ammonium salt group, such as N-2-hydroxy-3-acryloyloxypropyl-N,N,N-trimethylammonium chloride or N-methacryloylaminoethyl-N,N,N-dimethylbenzylammonium chloride; an unsaturated monomer containing an epoxy group, such as glycidyl (meth)acrylate; a styrene-based monomer, such as styrene, alpha-methylstyrene, 4-methylstyrene, 2-methylstyrene, 3-methylstyrene, 4-methoxystyrene, 2-hydroxymethylstyrene, 2-chlorostyrene, 4-chlorostyrene, 2,4-dichlorostyrene, 1-vinylnaphthalene, divinylbenzene, 4-(chloromethyl)styrene, 2-(chloromethyl)styrene, 3-(chloromethyl)styrene, 4-styrenesulfonic acid, or an alkali metal salt thereof (e.g., a sodium salt or a potassium salt); an unsaturated monomer containing a heterocyclic ring, such as 2-vinylthiophene or N-methyl-2-vinylpyrrole; a vinylamide such as N-vinylformamide or N-vinylacetamide; an α-olefin, such as diallylamine, triallyl isocyanurate, tri(2-methyl-allyl)isocyanurate, ethylene, propylene, 1-butene, 1-hexene, 1-octene, 1-decene, vinyl fluoride, vinylidene fluoride, trifluoroethylene, chlorotrifluoroethylene, tetrafluoroethylene, hexafluoropropylene, 2,3,3,3-tetrafluoropropylene, vinylidene chloride, vinyl chloride, 1-chloro-1-fluoroethylene, or 1,2-dichloro-1,2-difluoroethylene, 1H,1H,2H-perfluoro(n-1-hexene), or 1H,1H,2H-perfluoro(n-1-octene); an alkyl vinyl ether, such as isobutene, vinyl acetate, hydroxyethyl methacrylate, acrylonitrile, acrylamide, N,N-dimethylacrylamide, methyl vinyl ether, ethyl vinyl ether, butyl vinyl ether, tert-butyl vinyl ether, or cyclohexyl vinyl ether; a perfluoro(alkyl vinyl ether), such as hydroxyethyl vinyl ether, hydroxybutyl vinyl ether, perfluoro(methyl vinyl ether), perfluoro(ethyl vinyl ether), or perfluoro(n-propyl vinyl ether). One type of the compound that has a reactive carbon-carbon double bond and that is different from the compound represented by Formula (1) may be used singly, or two or more types thereof may be used in combination.

<Method of Producing Fluorine-Containing Polymer>

The method of producing the fluorine-containing polymer according to the present disclosure is not particularly limited. In one aspect, the method of producing the fluorine-containing polymer includes polymerizing compounds having at least two reactive carbon-carbon double bonds,
in the presence of an ionic catalyst represented by the following Formula (2), which comprises an anion and a counter cation, and a compound having a partial structure represented by the following Formula (3), or
in the presence of at least one compound selected from the group consisting of a compound represented by the following Formula (4) and a compound represented by the following Formula (5).

$$A^+B^- \tag{2}$$

In Formula (2), $A^+$ represents a cation including at least one element selected from the group consisting of nitrogen and phosphorus, an alkali metal ion, or a proton, and $B^-$ represents a monovalent anion including at least one element selected from the group consisting of iodine, nitrogen, and sulfur.

In Formula (3), * represents a bonding site that is bonded to an organic group. Each of $X^1$ and $X^2$ independently represents a hydrogen atom, a fluorine atom, a chlorine atom, or —$CX^3X^4X^5$. Each of $X^3$ to $X^5$ independently represents a hydrogen atom, a fluorine atom, or a chlorine atom.

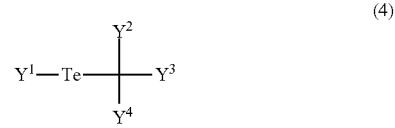

In Formula (4), $Y^1$ represents an unsubstituted alkyl group having from 1 to 8 carbon atoms, a substituted alkyl group having from 1 to 8 carbon atoms, an unsubstituted aryl group having from 3 to 12 carbon atoms, or a substituted aryl group having from 3 to 16 carbon atoms. Each of $Y^2$ and $Y^3$ independently represents a hydrogen atom, or a substituted or unsubstituted alkyl group having from 1 to 8 carbon atoms. $Y^4$ represents a hydrogen atom, an unsubstituted alkyl group having from 1 to 8 carbon atoms, a substituted alkyl group having from 1 to 8 carbon atoms, an unsubstituted aryl group having from 3 to 12 carbon atoms, a substituted aryl group having from 3 to 16 carbon atoms, an acyl group having from 2 to 8 carbon atoms, an amide group having from 2 to 8 carbon atoms, an oxycarbonyl group, or a cyano group;

$$Y^5-Te-Te-Y^6 \quad (5)$$

In Formula (5), each of $Y^5$ and $Y^6$ independently represents an unsubstituted alkyl group having from 1 to 8 carbon atoms, a substituted alkyl group having from 1 to 8 carbon atoms, an unsubstituted aryl group having from 3 to 12 carbon atoms, or a substituted aryl group having from 3 to 16 carbon atoms.

The method of producing the fluorine-containing polymer uses a highly-controlled polymerization method. While the fluorine-containing polymer according to the present disclosure can also be produced by free radical polymerization, use of the highly-controlled polymerization method tends to prevent gelation caused by rapid progression of crosslinking and suitably provide a moldable fluorine-containing polymer having a high degree of unsaturation. In addition, use of such a fluorine-containing polymer tends to suitably provide a cured product having a high crosslink density.

<A. A Method of Producing a Fluorine-Containing Polymer Including Polymerizing a Compound Having at Least Two Reactive Carbon-Carbon Double Bonds in the Presence of an Ionic Catalyst Represented by Formula (2), which Includes an Anion and a Counter Cation, and a Compound Having a Partial Structure Represented by Formula (3)>

The method of producing a fluorine-containing polymer, including polymerizing a compound having at least two reactive carbon-carbon double bonds in the presence of an ionic catalyst represented by formula (2), which includes an anion and a counter cation, and a compound having a partial structure represented by formula (3), is based on a polymerization method called an RCMP (Reversible Complexation Mediated living radical Polymerization) method. Hereinafter, this production method is also referred to as production method A.

An overview of the scheme of the production method A is shown below. The C—I bond in the compound having a partial structure represented by Formula (3) is broken with the ionic catalyst represented by Formula (2) to generate a carbon radical. The generated carbon radical reacts with the compound having reactive carbon-carbon double bonds. On the other hand, since the bonding between the ionic catalyst and I derived from the compound having a partial structure represented by Formula (3) is a reversible reaction, I is recombined with the carbon radical that has undergone the reaction with the compound having reactive carbon-carbon double bonds, and the reaction product again becomes a compound having a partial structure represented by Formula (3). Namely, an insertion reaction of the compound having reactive carbon-carbon double bonds into the compound having a partial structure represented by Formula (3) takes place.

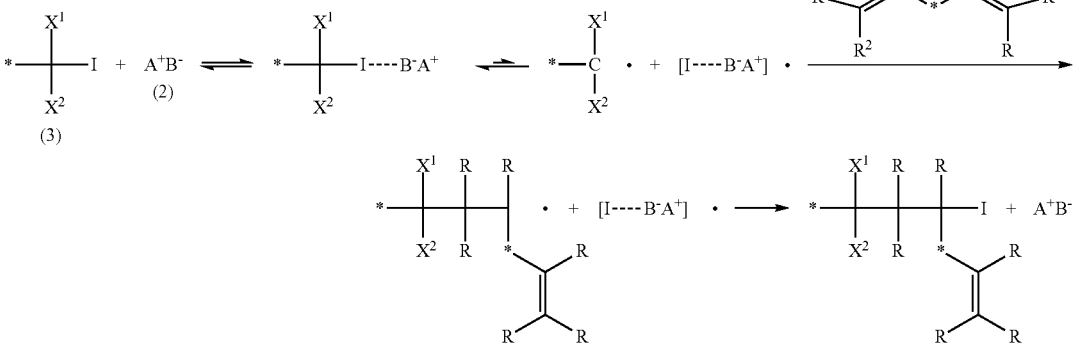

In the compound having reactive carbon-carbon double bonds in the scheme diagram described above, R represents any atom or atoms, and * represents a single bond or a divalent organic group.

The insertion reaction is repeated by the ionic catalyst represented by Formula (2) again abstracting I bonded to the compound produced by the above reaction, to obtain a polymer.

The compound having a partial structure represented by Formula (3) functions as a radical initiator. Conventionally, azo compounds and peroxides have generally been used as radical initiators. However, in general, it is difficult to control the reaction when these radical initiators are used because of their extremely high reaction rates. On the other hand, use of the compound having a partial structure represented by Formula (3) as a radical initiator in the presence of the ionic catalyst represented by Formula (2) allows the reaction to progress very mildly and enables control of the reaction.

[Ionic Catalyst]

The ionic catalyst represented by the following Formula (2), which includes an anion and a counter cation, will be described in detail below.

$$A^+B^- \quad (2)$$

In Formula (2), $A^+$ represents a cation including at least one element selected from the group consisting of nitrogen and phosphorus, an alkali metal ion, or a proton. $B^-$ represents a monovalent anion including at least one element selected from the group consisting of iodine, nitrogen, and sulfur.

As for the monovalent anion represented by $B^-$, examples of the iodide anion include an iodide ion ($I^-$) and a triiodide ion ($I_3^-$). Examples of other anions include an azide ion ($N_3^-$), a cyanide ion ($CN^-$), a cyanate anion ($OCN^-$), and a thiocyanate ion ($SCN^-$).

In particular, from the viewpoint of interaction with the iodine atom of the compound having a partial structure represented by Formula (3), an iodine-containing anion is preferable, and an iodide ion is more preferable.

As for the counter cation represented by $A^+$, examples of the nitrogen-containing cation include a quaternary ammonium cation, such as tetrabutylammonium $((C_4H_9)_4N^+)$. Examples of the phosphorus-containing cation include a quaternary phosphonium cation, such as tetraphenylphosphonium $((C_6H_5)_4P^+)$.

Examples of the alkali metal ion include a lithium ion, a sodium ion, a potassium ion, a rubidium ion, and a cesium ion.

In particular, from the viewpoint of heat resistance, a phosphorus-containing cation or an alkali metal ion is preferable, and, from the viewpoint of reactivity, a quaternary phosphonium cation is more preferable, and tetraphenylphosphonium is further preferable.

As the ionic catalyst represented by Formula (2), tetraphenylphosphonium iodide, tetrabutylammonium iodide, cesium iodide, lithium iodide and the like are preferable. One type of the ionic catalyst represented by Formula (2) may be used singly, or two or more types thereof may be used in combination.

[Compound Having Partial Structure Represented by Formula (3)]

The compound having a partial structure represented by Formula (3) will be described in detail below.

(3)

In Formula (3), * represents a bonding site that is bonded to an organic group. Each of $X^1$ and $X^2$ independently represents a hydrogen atom, a fluorine atom, a chlorine atom, or $-CX^3X^4X^5$. Each of $X^3$ to $X^5$ independently represents a hydrogen atom, a fluorine atom, or a chlorine atom.

As long as the compound having a partial structure represented by Formula (3) has the partial structure represented by Formula (3), the overall structure of the compound is not limited in any way. The organic group to which * is bonded is not limited to a hydrocarbon group, and may be any type of functional group, such as a hydroxyl group or an amino group, a halogeno group (halogen atom) or a hydrogen atom. Further, the organic group may contain a heteroatom, and the valence and molecular weight thereof are not particularly limited.

In Formula (3), at least one of $X^1$ and $X^2$ is preferably a fluorine atom. In a case in which the partial structure represented by Formula (3) has a structure in which a fluorine atom is directly bonded to a carbon atom, such as $-CFX^1I$ or $CFX^2I$, the iodine atom is easily removed, and thus the compound having a partial structure represented by Formula (3) tends to suitably function as a radical initiator.

In the compound having a partial structure represented by Formula (3), the number of the partial structure represented by Formula (3) is not particularly limited. For example, the compound having a partial structure represented by Formula (3) may be a monoiodide organic compound having one partial structure represented by Formula (3), a diiodide organic compound having two partial structures represented by Formula (3), or a polyiodide organic compound having three or more partial structures represented by Formula (3). Preferably, the compound having a partial structure represented by Formula (3) is at least one selected from the group consisting of a monoiodide organic compound and a diiodide organic compound. One type of the compound having a partial structure represented by Formula (3) may be used singly, or two or more types thereof may be used in combination.

—Monoiodide Organic Compound—

The monoiodide organic compound may be a monoiodide fluorine-containing organic compound in which a substituted or unsubstituted alkyl group, or a halogen atom or a hydrogen atom is boded to * in Formula (3). Examples of the substituted or unsubstituted alkyl group include a substituted or unsubstituted alkyl group having from 1 to 7 carbon atoms. Examples of the substituent of the substituted alkyl group include a fluorine atom, a chlorine atom, an alkoxy group, and a fluoroalkoxy group.

Specific examples of the monoiodide organic compound include difluoroiodomethane, trifluoroiodomethane, chlorodifluoroiodomethane, 1,1-difluoroethyl iodide, 1,1-difluoro-n-propyl iodide, 1,1-difluoro-n-butyl iodide, 1,1-difluoro-isobutyl iodide, 1,1-difluoro-n-pentyl iodide, sec-butyldifluoromethylene iodide, tert-butyldifluoromethylene iodide, 1,1-difluoro-n-hexyl iodide, 1,1-difluoro-n-heptyl iodide, 1,1-difluoro-n-octyl iodide, cyclohexyldifluoromethylene iodide, $C_2F_5I$, $CHF_2CF_2I$, $CF_3CF_2CF_2I$, $(CF_3)_2CFI$, $CF_3(CF_2)_3I$, $(CF_3)_2CFCF_2I$, and $CF_3(CF_2)_4I$, and $CF_3(CF_2)_5I$.

The monoiodide organic compound can be produced by a conventionally known method, for example, by a reaction between $I_2$ and a radical initiator, such as $(R^{10}CF_2C(=O)O)_2$.

—Diiodide Organic Compound—

Examples of the diiodide organic compound include a diiodide fluorine-containing organic compound having a partial structure represented by Formula (3) in which * in Formula (3) is boded, via a single bond or a divalent organic group, such as a substituted or unsubstituted alkylene group, a substituted or unsubstituted arylene group, a substituted or unsubstituted arylene alkylene group, a substituted or unsubstituted alkylene arylene alkylene group, or an ether linkage.

Examples of the substituted or unsubstituted alkylene group include a substituted or unsubstituted alkylene group having from 1 to 6 carbon atoms, preferably from 1 to 4 carbon atoms.

Examples of the unsubstituted alkylene group include a methylene group, an ethylene group, an n-propylene group, an isopropylene group, an n-butylene group, an isobutylene group, an n-pentylene group, an n-hexylene group, and a 1,4-cyclohexylene group.

Examples of the substituted alkylene group include an alkylene group that has, at any certain position, a substituent such as a fluorine atom, a chlorine atom, an alkoxy group, or a fluoroalkoxy group. In particular, an alkylene group having from 2 to 12 fluorine atoms is preferable, and from the viewpoint of suppressing hydrogen-atom abstraction reactions by radicals, a perfluoroalkylene group is more preferable, a perfluoroalkylene group having from 1 to 4 carbon atoms is further preferable, and a perfluoroalkylene group having from 2 to 4 carbon atoms is particularly preferable.

Examples of the substituted or unsubstituted arylene group include an arylene group having from 6 to 12 carbon atoms, and a heteroarylene group having from 3 to 12 carbon atoms. Specific examples include a 1,2-phenylene group, a 1,3-phenylene group, a 1,4-phenylene group, a 4,4'-biphenylene group, a 2,2'-biphenylene group, a 2,6-naphthylene group, a 2,7-naphthylene group, a 2,4-pyridylene group, a 2,5-pyridylene group, a 2,6-pyridylene group, a pyrrolene group, a furylene group, a thienylene group, and a 1,5-furandiyl group.

Examples of the substituted or unsubstituted arylene alkylene group include an arylene alkylene group having from 7 to 15 carbon atoms, and a heteroarylene alkylene group having from 4 to 15 carbon atoms. Specific examples include a benzylene group, a 2-pyridylenemethylene group, a 3-pyridylenemethylene group, and a 4-pyridylenemethylene group.

Examples of the substituted or unsubstituted alkylene arylene alkylene group include an alkylene arylene alkylene group having from 8 to 18 carbon atoms, and an alkylene heteroarylene alkylene group having from 5 to 18 carbon atoms. Specific examples include a 1,2-dimethylenephenylene group, a 1,3-dimethylenephenylene group, a 1,4-dimethylenephenylene group, a 2,2'-dimethylenebiphenylene group, a 2,4-dimethylenepyridylene group, a 2,5-dimethylenepyridylene group, a 2,6-dimethylenepyridylene group, and a 1,5-dimethylfurandiyl group.

Specific examples of the diiodide organic compound include 1,2-diiodotetrafluoroethane, 1,4-diiodo-octafluorobutane, and 1,6-diiodo-dodecafluorohexane. In particular, 1,4-diiodo-octafluorobutane is preferable from the viewpoint of being a low-volatility liquid that is easy to handle.

The method of producing the diiode fluorine-containing organic compound is not particularly limited, and a conventionally known method can be used.

—Polyiodide Organic Compound—

Examples of the polyiodide organic compound include a polyiodide organic compound having plural partial structures represented by Formula (3), in which a polymeric partial structure such as an unvulcanized fluoroelastomer; polysiloxane bonded via a divalent linking group such as a substituted or unsubstituted alkylene group, or ether linkage; or the like is boded to * in Formula (3). Here, examples of the polysiloxane include silicone and a product generated by a condensation reaction of a silane coupling agent.

The polyiodide organic compound can be produced by a conventionally known method.

[Compound Having at Least Two Reactive Carbon-Carbon Double Bonds]

Polymerization of a compound having at least two reactive carbon-carbon double bonds using the production method A enables introduction of many branching points and crosslinking points, and thus, when the obtained fluorine-containing polymer is cured, a dense crosslinked structure can be formed.

In one preferred aspect, the compound having at least two reactive carbon-carbon double bonds includes a compound represented by the following Formula (1).

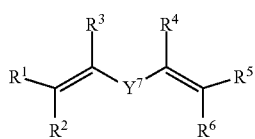

(1)

In Formula (1), $Y^7$ represents a divalent organic group having at least one fluorine atom. Each of $R^1$ to $R^6$ independently represents a hydrogen atom, a fluorine atom, a chlorine atom, a bromine atom, an iodine atom, or an organic group having from 1 to 5 carbon atoms. Each of $R^1$ and $R^3$, $R^4$ and $R^5$, $R^2$ and $Y^7$, and $R^6$ and $Y^7$ may be independently linked each other to form a ring structure.

Details on the compound having at least two reactive carbon-carbon double bonds and the compound represented by Formula (1) that are used in the production method A are the same as those described above in the section <Fluorine-containing Polymer>. One type of the compound having at least two reactive carbon-carbon double bonds may be used singly, or two or more types thereof may be used in combination, and one type of the compound represented by Formula (1) may be used singly, and two or more types thereof may be used in combination.

In the production method A, a compound represented by Formula (1) and a compound that has a reactive carbon-carbon double bond and that is different from the compound represented by Formula (1) may be copolymerized. Details on the compound that has a reactive carbon-carbon double bond and that is different from the compound represented by Formula (1) used for the copolymerization are the same as those described above in the section <Fluorine-containing Polymer>.

[Other Optional Components]

In the production method A, other components, such as a radical initiator that is different from the compound having a partial structure represented by Formula (3), a solvent, an emulsifier, a suspension assisting agent, an acid, and an alkali, may be further used.

(Radical Initiator)

In the production method A, a radical initiator that is different from the compound having a partial structure represented by Formula (3) may be used in combination. Examples of the radical initiator include an azo radical initiator and a peroxide radical initiator. One type of the radical initiator may be used singly, or two or more types thereof may be used in combination.

Examples of the azo radical initiator include 2,2'-azobis(isobutyronitrile) (AIBN), 2,2'-azobis(2-methylbutyronitrile) (AMBN), 2,2'-azobis(2,4-dimethylvaleronitrile) (ADVN), 1,1'-azobis(1-cyclohexanecarbonitrile) (ACHN), dimethyl-2,2'-azobisisobutyrate (MAIB), 4,4'-azobis(4-cyanovaleric acid) (ACVA), 1,1'-azobis(1-acetoxy-1-phenylethane), 2,2'-azobis(2-methylbutylamide), 2,2'-azobis(4-methoxy-2,4-dimethylvaleronitrile), 2,2'-azobis(2-methylamidinopropane) dihydrochloride, 2,2'-azobis[2-(2-imidazolin-2-yl)propane], 2,2'-azobis[2-methyl-N-(2-hydroxyethyl)propionamide], 2,2'-azobis(2,4,4-trimethylpentane), 2-cyano-2-propylazoformamide, 2,2'-azobis(N-butyl-2-methylpropionamide), and 2,2'-azobis(N-cyclohexyl-2-methylpropionamide).

Examples of the peroxide radical initiator include diisopropylperoxydicarbonate, tert-butylperoxypivalate, and benzoyl peroxide.

(Solvent)

In the production method A, an organic solvent or an aqueous solvent may be used. One type of the solvent may be used singly, or two or more types thereof may be used in combination.

Examples of the organic solvent include benzene, toluene, N,N-dimethylformamide (DMF), dimethyl sulfoxide (DMSO), acetone, 2-butanone(methyl ethyl ketone), dioxane, hexafluoroisopropanol, chloroform, carbon tetrachloride, tetrahydrofuran (THF), ethyl acetate, 1H-perfluorohexane, 1H,1H,1H,2H,2H-perfluorooctane, trifluoromethylbenzene, 1,3-bis(trifluoromethyl)benzene, 1,4-bis(trifluoromethyl)benzene, benzotrifluoride, and chlorobenzene.

Further, an ionic liquid, such as N-methyl-N-methoxymethylpyrolidium tetrafluoroborate, N-methyl-N-ethoxymethyl tetrafluoroborate, 1-methyl-3-methylimidazolium tetrafluoroborate, 1-methyl-3-methylimidazolium hexafluorophosphate, or 1-methyl-3-methylimidazolium chloride, may also be used.

Examples of the aqueous solvent include water, methanol, ethanol, isopropanol, n-butanol, ethyl cellosolve, butyl cellosolve, 1-methoxy-2-propanol, and diacetone alcohol.

[Polymerization Method]

A specific and exemplary polymerization method according to the production method A will be described below.

In a vessel purged with an inert gas or a vacuum pressure vessel, an ionic catalyst, a compound having a partial structure represented by Formula (3), and a compound having at least two reactive carbon-carbon double bonds are mixed. Examples of the inert gas include nitrogen, argon, and helium. In particular, nitrogen and argon are preferable, and nitrogen is more preferable. A radical initiator, such as an azo polymerization initiator, may be used in combination in order to accelerate the rate of polymerization.

The amount of the compound having a partial structure represented by Formula (3) used is preferably 0.001 mol or more, and more preferably 0.005 mol or more, relative to 1 mol of the compound having a reactive carbon-carbon double bond (total amount of the compound having at least two reactive carbon-carbon double bonds, and other compound(s) having a reactive carbon-carbon double bond used as necessary). The amount used is preferably 1 mol or less, more preferably 0.5 mol or less, and further preferably 0.1 mol or less.

The amount of the ionic catalyst used is preferably 0.001 mol or more, more preferably 0.005 mol or more, and further preferably 0.01 mol or more, relative to 1 mol of the compound having a reactive carbon-carbon double bond (total amount of the compound having at least two reactive carbon-carbon double bonds, and other compound(s) having a reactive carbon-carbon double bond used as necessary). The amount used is preferably 1 mol or less, more preferably 0.5 mol or less, and further preferably 0.1 mol or less.

In a case in which the compound having a partial structure represented by Formula (3) and other radical initiator(s) are used in combination, the amount of the other radical initiator(s) used may be 0.01 mol or more, or may be 0.1 mol or more, relative to 1 mol of the compound having a partial structure represented by Formula (3). The amount used may be 100 mol or less, 10 mol or less, or 1 mol or less.

In a case in which a monoiodide organic compound and a diiodide organic compound are used in combination as the compound having a partial structure represented by Formula (3), the amount of the diiodide organic compound used is preferably 0.01 mol or more, more preferably 0.05 mol or more, and further preferably 0.1 mol or more, relative to 1 mol of the monoiodide organic compound. The amount of the diiodide organic compound used is preferably 100 mol or less, more preferably 10 mol or less, and further preferably 5 mol or less, relative to 1 mol of the monoiodide organic compound.

While the above-described polymerization reaction can be carried out in the absence of any solvent, the reaction can also be carried out by using an organic solvent or an aqueous solvent commonly used in radical polymerization.

The amount of the solvent used can be adjusted as appropriate. For example, the amount of the solvent relative to 1000 g of the obtained fluorine-containing polymer is preferably 0.01 L or more, more preferably 0.05 L or more, and further preferably 0.1 L or more. The amount of the solvent relative to 1000 g of the obtained fluorine-containing polymer is preferably 50 L or less, more preferably 10 L or less, and further preferably 5 L or less.

Next, the above-obtained mixture is stirred. The reaction temperature and the reaction time are preferably adjusted as appropriate depending on the molecular weight or the molecular weight distribution of the fluorine-containing polymer to be obtained. Stirring may be carried out at 60° C. to 250° C., for 5 hours to 100 hours. Preferably, stirring is carried out at 100° C. to 200° C., for 10 hours to 30 hours. The reaction may be carried out at normal pressure, and the pressure may be increased or decreased.

After the reaction ends, the target substance is isolated by removing the solvent used, remaining monomers and the like under a reduced pressure by a usual method to obtain a target polymer, or by carrying out a re-precipitation treatment using a solvent in which the target polymer is insoluble. The reaction treatment may be carried out by any treatment method as long as it does not harm the target substance.

Such a polymerization method enables excellent molecular weight control and molecular weight distribution control under very mild conditions.

A block copolymer, an alternating copolymer, or a random copolymer may be prepared by the polymerization method using two or more compounds having a reactive carbon-carbon double bond.

<B. A Method of Producing a Fluorine-Containing Polymer Including Polymerizing a Compound Having at Least Two Reactive Carbon-Carbon Double Bonds in the Presence of at Least One Compound Selected from the Group Consisting of a Compound Represented by Formula (4) and a Compound Represented by Formula (5)>

The method of producing the fluorine-containing polymer including polymerizing a compound having at least two reactive carbon-carbon double bonds in the presence of at least one compound selected from the group consisting of a compound represented by Formula (4) and a compound represented by Formula (5) is based on a polymerization method called a TERP method. Hereinafter, the production method is also referred to as production method B. The principle and specific examples of the TERP method can be found, for example, in WO 2018/164147.

[Compound Represented by Formula (4)]

The compound represented by Formula (4) is the following organic mono-tellurium compound.

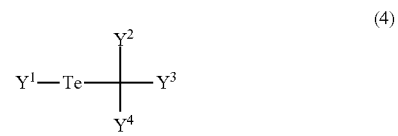

(4)

In Formula (4), $Y^1$ represents an unsubstituted alkyl group having from 1 to 8 carbon atoms, a substituted alkyl group having from 1 to 8 carbon atoms, an unsubstituted aryl group having from 3 to 12 carbon atoms, or a substituted aryl group having from 3 to 16 carbon atoms. Each of $Y^2$ and $Y^3$ independently represents a hydrogen atom, or a substituted or unsubstituted alkyl group having from 1 to 8 carbon atoms. $Y^4$ represents a hydrogen atom, an unsubstituted alkyl group having from 1 to 8 carbon atoms, a substituted alkyl group having from 1 to 8 carbon atoms, an unsubstituted aryl group having from 3 to 12 carbon atoms, a substituted aryl group having from 3 to 16 carbon atoms, an acyl group having from 2 to 8 carbon atoms, an amide group having from 2 to 8 carbon atoms, an oxycarbonyl group, or a cyano group.

The group represented by $Y^1$ is specifically as described below.

Examples of the unsubstituted alkyl group having from 1 to 8 carbon atoms include a straight-chain, branched-chain, or cyclic alkyl group having from 1 to 8 carbon atoms, such as a methyl group, an ethyl group, an n-propyl group, an isopropyl group, a cyclopropyl group, an n-butyl group, a sec-butyl group, a tert-butyl group, cyclobutyl group, an n-pentyl group, an n-hexyl group, an n-heptyl group, and an n-octyl group. In particular, a straight-chain or branched-chain alkyl group having from 1 to 4 carbon atoms is preferable, and a methyl group, an ethyl group, or an n-butyl group is more preferable.

Examples of the substituted alkyl group having from 1 to 8 carbon atoms include an alkyl group that has, at any certain position, a substituent such as a fluorine atom, a chlorine atom, an alkoxy group, or a fluoroalkoxy group. In particular, an alkyl group having from 2 to 13 fluorine atoms is preferable, and from the viewpoint of suppressing the hydrogen atom abstracting reaction by radicals, a (perfluoroalkyl) ethyl group having from 3 to 8 carbon atoms is preferable.

Examples of the unsubstituted aryl group having from 3 to 12 carbon atoms include a homoaryl group, such as a phenyl group and a naphthyl group; and a heteroaryl group, such as a pyridyl group, a pyrrole group, a furyl group, and a thienyl group. In particular, a homoaryl group is preferable, and a phenyl group is more preferable.

Examples of the substituted aryl group having from 3 to 16 carbon atoms include an aryl group that has, at any certain position, preferably at a para position or an ortho position, one to four substituents, preferably one to three substituents, and more preferably one substituent, such as a halogen atom, a hydroxy group, an alkoxy group, an amino group, a nitro group, a cyano group, a carbonyl-containing group represented by $-COR^a$, a sulfonyl group, or a trifluoromethyl group. $R^a$ described above represents an alkyl group having from 1 to 8 carbon atoms, preferably a straight-chain or branched-chain alkyl group having from 1 to 4 carbon atoms; an alkoxy group having from 1 to 8 carbon atoms, preferably a straight-chain or branched-chain alkoxy group having from 1 to 4 carbon atoms; an aryl group; or an aryloxy group.

The groups represented by $Y^2$ and $Y^3$ are specifically as described below.

Examples of the substituted or unsubstituted alkyl group having from 1 to 8 carbon atoms include the substituted or unsubstituted alkyl group having from 1 to 8 carbon atoms described above in connection with $Y^1$. $Y^2$ and $Y^3$ are each preferably a hydrogen atom or an alkyl group having from 1 to 4 carbon atoms.

The group represented by $Y^4$ is specifically as described below.

Examples of the unsubstituted alkyl group having from 1 to 8 carbon atoms, the substituted alkyl group having from 1 to 8 carbon atoms, the unsubstituted aryl group having from 3 to 12 carbon atoms, and the substituted aryl group having from 3 to 16 carbon atoms each include the groups described above in connection with $Y^1$.

Examples of the acyl group having from 2 to 8 carbon atoms include acetyl group, and benzoyl group.

Examples of the amide group having from 2 to 8 carbon atoms include: a carbamoyl group-containing group, such as a carbamoylmethyl group, a dicarbamoylmethyl group, and a 4-carbamoylphenyl group; a thiocarbamoyl group-containing group, such as a thiocarbamoylmethyl group and a 4-thiocarbamoylphenyl group; and a group containing an N-substituted carbamoyl group, such as dimethylcarbamoylmethyl group.

Examples of the oxycarbonyl group include a group represented by $-COOR^b$. Here, $R^b$ represents a hydrogen atom; an alkyl group having from 1 to 8 carbon atoms, preferably a straight-chain or branched-chain alkyl group having from 1 to 4 carbon atoms; an alkenyl group having from 2 to 8 carbon atoms, preferably a straight-chain or branched-chain alkenyl group having from 2 to 4 carbon atoms; an alkynyl group having from 2 to 8 carbon atoms, preferably a straight-chain or branched-chain alkynyl group having from 2 to 4 carbon atoms; or an aryl group having from 3 to 12 carbon atoms.

The alkyl group having from 1 to 8 carbon atoms, the alkenyl group having from 2 to 8 carbon atoms, the alkynyl group having from 2 to 8 carbon atoms, and the aryl group having from 3 to 12 carbon atoms represented by R may have, at any certain position, one to four, preferably one to three, more preferably one substituent such as a halogen atom, a hydroxy group, an alkoxy group, a trialkylsilyl ether group, a trialkylsilyl group, an amino group, a nitro group, a cyano group, a sulfonyl group, and a trifluoromethyl group.

Examples of the oxycarbonyl group include a carboxy group, a methoxycarbonyl group, an ethoxycarbonyl group, a propoxycarbonyl group, an n-butoxycarbonyl group, a sec-butoxycarbonyl group, a tert-butoxycarbonyl group, an n-pentoxycarbonyl group, and a phenoxycarbonyl group. In particular, a methoxycarbonyl group or an ethoxycarbonyl group is preferable.

In particular, $Y^4$ is preferably an aryl group having from 5 to 12 carbon atoms, an oxycarbonyl group, or a cyano group.

In one preferred aspect, the compound represented by Formula (4) may be a compound in which $Y^1$ represents an alkyl group having from 1 to 4 carbon atoms or a phenyl group; each of $Y^2$ and $Y^3$ independently represents a hydrogen atom or an alkyl group having from 1 to 4 carbon atoms; and $Y^4$ represents an aryl group having from 5 to 12 carbon atoms or an oxycarbonyl group.

In one particularly preferred aspect, the compound represented by Formula (4) may be a compound in which $Y^1$ represents an alkyl group having from 1 to 4 carbon atoms or a phenyl group; each of $Y^2$ and $Y^3$ independently represents a hydrogen atom or an alkyl group having from 1 to 4 carbon atoms; and $Y^4$ represents a phenyl group, a methoxycarbonyl group, or an ethoxycarbonyl group.

Specific examples of the compound represented by Formula (4) include compounds described in WO 2004/014848 and WO 2004/014962, such as (methyltellanylmethyl)benzene, (methyltellanylmethyl)naphthalene, ethyl-2-methyl-2-methyltellanyl-propionate, ethyl-2-methyl-2-n-butyltellanyl-propionate, (2-trimethylsiloxyethyl)-2-methyl-2-methyltellanyl-propinate, (2-hydroxyethyl)-2-methyl-2-methyltellanyl-propinate, and (3-trimethylsilylpropargyl)-2-methyl-2-methyltellanyl-propinate. Examples further include compounds such as ethyl-2-methyl-2-1H,1H,2H,2H-heptadecafluorodecyltellanyl-propionate, methyl-2-methyl-2-1H,1H,2H,2H-heptadecafluorodecyltellanyl-propionate, and N,N-diethyl-2-methyl-2-1H,1H,2H,2H-heptadecafluorodecyltellanyl-propionamide, which are described in Polymer Preprints, Japan Vol. 65, No. 1 (2016), publishing number 2D03. One type of the compound represented by Formula (4) may be used singly, or two or more types thereof may be used in combination.

The method of producing the compound represented by Formula (4) is not particularly limited, and the compound can be produced by known methods described in WO 2004/014848, WO 2004/014962, and WO 2018/164147.

[Compound Represented by Formula (5)]

The compound represented by Formula (5) is the following organic di-tellurium compound.

$$Y^5\text{—Te—Te—}Y^6 \qquad (5)$$

In Formula (5), each of $Y^5$ and $Y^6$ independently represents an unsubstituted alkyl group having from 1 to 8 carbon atoms, a substituted alkyl group having from 1 to 8 carbon atoms, an unsubstituted aryl group having from 3 to 12 carbon atoms, or a substituted aryl group having from 3 to 16 carbon atoms.

In Formula (5), details on each of $Y^5$ and $Y^6$ are independently the same as the details on $Y^1$ in Formula (4) described above.

In one preferred aspect, the compound represented by Formula (5) may be a compound in which each of $Y^5$ and $Y^6$ independently represents an alkyl group having from 1 to 4 carbon atoms, or a phenyl group.

Specific examples of the compound represented by Formula (5) include dimethylditelluride, diethylditelluride, di-n-propylditelluride, diisopropylditelluride, dicyclopropylditelluride, di-n-butylditelluride, di-sec-butylditelluride, di-tert-butylditelluride, dicyclobutylditelluride, diphenylditelluride, bis-(p-methoxyphenyl)ditelluride, bis-(p-aminophenyl)ditelluride, bis-(p-nitrophenyl)ditelluride, bis-(p-cyanophenyl)ditelluride, bis-(p-sulfonyl phenyl)ditelluride, dinaphthylditelluride, and dipyridylditelluride. One type of the compound represented by Formula (5) may be used singly, or two or more types thereof may be used in combination.

In particular, dimethylditelluride, diethylditelluride, di-n-propylditelluride, di-n-butylditelluride, and diphenylditelluride are preferable.

[Compound Having at Least Two Reactive Carbon-Carbon Double Bonds]

Details on the compound having at least two reactive carbon-carbon double bonds used in the production method B, and the compound represented by Formula (1), which is a preferred aspect thereof, are the same as those described in connection with the production method A.

In the production method B, the compound represented by Formula (1) described above and a compound that has a reactive carbon-carbon double bond and that is different from the compound represented by Formula (1) may be copolymerized. Details on the compound that has a reactive carbon-carbon double bond and that is different from the compound represented by Formula (1) used in the copolymerization are the same as those described in connection with the production method A.

[Other Optional Components]

In the production method B, other components, such as a radical initiator that is different from the compound having a partial structure represented by Formula (3), a solvent, an emulsifier, a suspension assisting agent, an acid, and an alkali, may be further used. Details on such other optional components are the same as those described in connection with the production method A.

[Polymerization Method]

A specific and exemplary polymerization method according to the production method B will be described below.

In a vessel purged with an inert gas or a vacuum pressure vessel, at least one compound selected from the group consisting of a compound represented by Formula (4) and a compound represented by the following Formula (5), and a compound having at least two reactive carbon-carbon double bonds are mixed. Examples of the inert gas include nitrogen, argon, and helium. In particular, nitrogen and argon are preferable, and nitrogen is more preferable. A radical initiator, such as an azo polymerization initiator, may be used in combination in order to accelerate the rate of polymerization.

The amount of the compound represented by Formula (4) or the compound represented by Formula (5) used (in a case in which the compound represented by Formula (4) and the compound represented by Formula (5) are used in combination, the total amount thereof) is preferably 0.001 mol or more, more preferably 0.005 mol or more, and further preferably 0.01 mol or more, relative to 1 mol of the compound having a reactive carbon-carbon double bond (total amount of the compound having at least two reactive carbon-carbon double bonds, and other compound(s) having a reactive carbon-carbon double bond used as necessary). The amount used is preferably 1 mol or less, more preferably 0.5 mol or less, and further preferably 0.1 mol or less.

In a case in which an azo polymerization initiator is used in combination, the amount of the azo polymerization initiator used is preferably 0.01 mol or more, more preferably 0.05 mol or more, and further preferably 0.1 mol or more, relative to 1 mol of the compound represented by Formula (4) or the compound represented by Formula (5) (in a case in which the compound represented by Formula (4) and the compound represented by Formula (5) are used in combination, the total amount thereof). The amount used is preferably 50 mol or less, more preferably 10 mol or less, and further preferably 5 mol or less.

In a case in which the compound represented by Formula (4) and the compound represented by Formula (5) are used in combination, the amount of the compound represented by Formula (5) used relative to 1 mol of the compound represented by Formula (4) is preferably 0.01 mol or more, more preferably 0.05 mol or more, and further preferably 0.1 mol or more. The amount used is preferably 100 mol or less, more preferably 10 mol or less, and further preferably 5 mol or less.

While the above-described polymerization reaction can be carried out in the absence of any solvent, the reaction can also be carried out by using an organic solvent or an aqueous solvent commonly used in radical polymerization.

The amount of the solvent used can be adjusted as appropriate. For example, the amount of the solvent relative to 1000 g of the obtained fluorine-containing polymer is preferably 0.01 L or more, more preferably 0.05 L or more, and further preferably 0.1 L or more. The amount of the solvent relative to 1000 g of the obtained fluorine-containing polymer is preferably 50 L or less, more preferably 10 L or less, and further preferably 5 L or less.

Next, the above-obtained mixture is stirred. The reaction temperature and the reaction time are preferably adjusted as appropriate depending on the molecular weight or the molecular weight distribution of the fluorine-containing polymer to be obtained. Stirring may be carried out at 60° C. to 150° C., for 5 hours to 100 hours. Preferably, stirring is carried out at 80° C. to 120° C., for 10 hours to 30 hours. The reaction may be carried out at normal pressure, and the pressure may be increased or decreased.

After the reaction ends, the target substance is isolated by removing the solvent used, remaining monomers and the like under a reduced pressure by a usual method to obtain a target polymer, or by carrying out a re-precipitation treatment using a solvent in which the target polymer is insoluble. The reaction treatment may be carried out by any treatment method as long as it does not harm the target substance.

Such a polymerization method enables excellent molecular weight control and molecular weight distribution control under very mild conditions.

A block copolymer, an alternating copolymer, or a random copolymer may be prepared by the polymerization method using two or more compounds having a reactive carbon-carbon double bond.

EXAMPLES

Hereinafter, embodiments according to the present disclosure will be specifically described by way of Examples. However, embodiments according to the present disclosure are not limited to the following Examples. The following Examples 1 to 12 are working examples, and Examples 13 and 14 are reference examples.

Example 1

In a light-shielding glass reactor having an internal volume of 100 mL, placed in a nitrogen-purged glove box, 28 g (80 mmol) of 1,6-divinyldodecafluorohexane, 0.082 g (0.40 mmol) of diphenylditelluride, 0.10 g (0.40 mmol) of an azo radical initiator "V-40" (product name, FUJIFILM Wako Pure Chemical Corporation), and 72 g of benzotrifluoride, as well as a magnetic stirring bar, were introduced.

Stirring was started while raising the temperature of the oil bath to 100° C. Stirring was carried out for 16 hours at 200 rpm (200 rotations per minute) while maintaining the temperature.

The reactor was allowed to cool down to room temperature.

The obtained polymer solution was vacuum dried to obtain a viscous liquid. The liquid was added to 50 mL of methanol and stirred for 10 minutes, and thereafter, the liquid and the supernatant were separated using a centrifuge.

Again, the obtained liquid was added to 50 mL of methanol and stirred for 10 minutes, and thereafter, the liquid and the supernatant were separated using a centrifuge.

The obtained liquid was vacuum dried to obtain 2.1 g of a fluorine-containing polymer.

The obtained fluorine-containing polymer was soluble in tetrahydrofuran.

Mn of the obtained polymer was 2,800, and Mw of the obtained polymer was 3,900, as measured by size exclusion chromatography, The calculated polydispersity index (Mw/Mn) of the fluorine-containing polymer was 1.4.

The fluorine content of the obtained polymer determined in the manner described above was 60% by mass. The fluorine content of 1,6-divinyldodecafluorohexane was 64% by mass.

The degree of unsaturation of the obtained polymer measured in the manner described above was 1.0 mEq/g.

Tg of the obtained polymer measured in the manner described above was 9° C.

The ratio (E*2/E*1) of the minimum value (E*2) of the complex elastic modulus of the obtained polymer in the range of from (Tg+10° C.) to 250° C. to the maximum value (E*1) of the complex elastic modulus of the obtained polymer in the range of from −50° C. to (Tg−10° C.) is 0.01 or less, as measured in the manner described above.

The results of the measurements of the solubility and the complex elastic modulus confirmed that a fluorine-containing polymer was produced without gelation.

Example 2

In a stainless-steel autoclave equipped with a stirrer and having an internal volume of 100 mL, placed in a nitrogen-purged glove box, 5.7 g (16 mmol) of 1,6-divinyldodecafluorohexane, 0.082 g (0.20 mmol) of diphenylditelluride, 0.092 g (0.40 mmol) of an azo radical initiator "V-601" (product name, FUJIFILM Wako Pure Chemical Corporation), and 100 g 1H-perfluorohexane were introduced.

After 7.4 g (74 mmol) of tetrafluoroethylene was added under pressure, stirring was started while raising the internal temperature to 80° C. By carrying out the stirring at 200 rpm (200 rotations per minute) for 7 hours while maintaining the internal temperature, the internal pressure was reduced from 0.8 MPa (gauge pressure) to 0.7 MPa.

After cooling the autoclave with an ice-water bath, unreacted tetrafluoroethylene was purged.

The obtained polymer solution was vacuum dried to obtain a viscous liquid. The liquid was added to 50 mL of methanol and stirred for 10 minutes, and thereafter, the liquid and the supernatant were separated using a centrifuge.

Again, the obtained liquid was added to 50 mL of methanol and stirred for 10 minutes, and thereafter, the precipitated solid and the supernatant were separated using a centrifuge.

The obtained solid was vacuum dried to obtain 1.3 g of a fluorine-containing polymer.

The obtained fluorine-containing polymer was soluble in tetrahydrofuran.

Mn of the obtained polymer was 3,300, and Mw of the obtained polymer was 5,300, as measured by size exclusion chromatography, The calculated polydispersity index (Mw/Mn) of the fluorine-containing polymer was 1.6.

The fluorine content of the obtained polymer determined in the manner described above was 61% by mass.

The degree of unsaturation of the obtained polymer measured in the manner described above was 0.5 mEq/g.

Tg of the obtained polymer measured in the manner described above was 16° C.

The ratio (E*2/E*1) of the minimum value (E*2) of the complex elastic modulus of the obtained polymer in the range of from (Tg+10° C.) to 250° C. to the maximum value (E*1) of the complex elastic modulus of the obtained polymer in the range of from −50° C. to (Tg−10° C.) is 0.01 or less, as measured in the manner described above.

The results of the measurements of the solubility and the complex elastic modulus confirmed that a fluorine-containing polymer was produced without gelation.

Example 3

The same procedure was carried out as in Example 2 except that the reaction time was changed to 18 hours, by which the internal pressure was reduced from 0.8 MPa to 0.6 MPa.

After cooling the autoclave with an ice-water bath, unreacted tetrafluoroethylene was purged.

The obtained polymer solution was vacuum dried to obtain a viscous liquid. The liquid was added to 50 mL of methanol and stirred for 10 minutes, and thereafter, the liquid and the supernatant were separated using a centrifuge.

Again, the obtained liquid was added to 50 mL of methanol and stirred for 10 minutes, and thereafter, the precipitated solid and the supernatant were separated using a centrifuge.

The obtained solid was vacuum dried to obtain 2.6 g of a fluorine-containing polymer.

The obtained fluorine-containing polymer was soluble in tetrahydrofuran.

Mn of the obtained polymer was 6,200, and Mw of the obtained polymer was 9,500, as measured by size exclusion chromatography, The calculated polydispersity index (Mw/Mn) of the fluorine-containing polymer was 1.5.

The fluorine content of the obtained polymer determined in the manner described above was 64% by mass.

The degree of unsaturation of the obtained polymer measured in the manner described above was 0.4 mEq/g.

Tg of the obtained polymer measured in the manner described above was 20° C.

The ratio (E*2/E*1) of the minimum value (E*2) of the complex elastic modulus of the obtained polymer in the range of from (Tg+10° C.) to 250° C. to the maximum value (E*1) of the complex elastic modulus of the obtained polymer in the range of from −50° C. to (Tg−10° C.) is 0.01 or less, as measured in the manner described above.

The results of the measurements of the solubility and the complex elastic modulus confirmed that a fluorine-containing polymer was produced without gelation.

Example 4

The same procedure was carried out as in Example 2 except that 4.1 g (16 mmol) of 1,4-divinyloctafluorobutane was used instead of 5.7 g (16 mmol) of 1,6-divinyldodecafluorohexane, by which the internal pressure was reduced from 0.8 MPa to 0.6 MPa.

The obtained polymer solution was vacuum dried to obtain a viscous liquid. The liquid was added to 50 mL of methanol and stirred for 10 minutes, and thereafter, the liquid and the supernatant were separated using a centrifuge.

Again, the obtained liquid was added to 50 mL of methanol and stirred for 10 minutes, and thereafter, the liquid and the supernatant were separated using a centrifuge.

The obtained liquid was vacuum dried to obtain 2.7 g of a fluorine-containing polymer.

The obtained fluorine-containing polymer was soluble in tetrahydrofuran.

Mn of the obtained polymer was 5,000, and Mw of the obtained polymer was 6,600, as measured by size exclusion chromatography.

The calculated polydispersity index (Mw/Mn) of the fluorine-containing polymer was 1.3.

The fluorine content of the obtained polymer determined in the manner described above was 65% by mass.

The degree of unsaturation of the obtained polymer measured in the manner described above was 0.1 mEq/g.

Tg of the obtained polymer measured in the manner described above was 41° C.

The ratio (E*2/E*1) of the minimum value (E*2) of the complex elastic modulus of the obtained polymer in the range of from (Tg+10° C.) to 250° C. to the maximum value (E*1) of the complex elastic modulus of the obtained polymer in the range of from −50° C. to (Tg−10° C.) was 0.01 or less, as measured in the manner described above.

The results of the measurements of the solubility and the complex elastic modulus confirmed that a fluorine-containing polymer was produced without gelation.

Example 5

In a stainless-steel autoclave equipped with a stirrer and having an internal volume of 200 mL, placed in a nitrogen-purged glove box, 5.7 g (16 mmol) of 1,6-divinyldodecafluorohexane, 0.75 g (1.6 mmol) of tetraphenylphosphonium iodide, 0.14 g (0.40 mmol) of n-nonafluorobutyl iodide, and 200 g of 1H-perfluorohexane were introduced.

After 8.1 g (81 mmol) of tetrafluoroethylene was added under pressure, stirring was started while raising the internal temperature to 140° C. By carrying out the stirring at 200 rpm for 18 hours while maintaining the internal temperature, the internal pressure was reduced from 1.4 MPa to 1.3 MPa.

After cooling the autoclave with an ice-water bath, unreacted tetrafluoroethylene was purged.

The obtained polymer solution was vacuum dried to obtain a viscous liquid. The liquid was added to 50 mL of methanol and stirred for 10 minutes, and thereafter, the liquid and the supernatant were separated using a centrifuge.

The obtained polymer solution was filtered through celite to remove solids. The filtrate was vacuum dried to obtain a viscous liquid.

The obtained liquid was added to 30 mL of methanol and stirred for 10 minutes, and thereafter, the liquid and the supernatant were separated using a centrifuge.

The obtained liquid was vacuum dried to obtain 0.7 g of a fluorine-containing polymer.

The obtained fluorine-containing polymer was soluble in tetrahydrofuran.

Mn of the obtained polymer was 2,200, and Mw of the obtained polymer was 3,500, as measured by size exclusion chromatography.

The calculated polydispersity index (Mw/Mn) of the fluorine-containing polymer was 1.6.

The fluorine content of the obtained polymer determined in the manner described above was 65% by mass.

The degree of unsaturation of the obtained polymer measured in the manner described above was 0.7 mEq/g.

Tg of the obtained polymer measured in the manner described above was −10° C.

By placing the obtained polymer on a glass substrate and heating the polymer to 180° C. under a nitrogen atmosphere, it was confirmed by visual observation that the polymer was molten and wet spread. The ratio (E*2/E*1) of the minimum value (E*2) of the complex elastic modulus of the obtained polymer in the range of from (Tg+10° C.) to 250° C. to the maximum value (E*1) of the complex elastic modulus of the obtained polymer in the range of from −50° C. to (Tg−10° C.) is considered to be 0.01 or less based on the results described above, although viscometry could not be performed owing to the low yield.

The results of the solubility and heating tests confirmed that a fluorine-containing polymer was produced without gelation.

Example 6

In a stainless-steel autoclave equipped with a stirrer and having an internal volume of 100 mL placed in a nitrogen-purged glove box, 1.4 g (4.0 mmol) of 1,6-divinyldodecafluorohexane, 0.13 g (0.40 mmol) of an azo radical initiator "VAm-110" (product name, FUJIFILM Wako Pure Chemical Corporation), and 100 g of 1H-perfluorohexane were introduced.

After 2.2 g (22 mmol) of tetrafluoroethylene was added under pressure, stirring was started while raising the internal temperature to 125° C. By carrying out the stirring at 200 rpm for 20 minutes while maintaining the internal temperature, the internal pressure was reduced from 0.9 MPa to 0.8 MPa.

After cooling the autoclave with an ice-water bath, unreacted tetrafluoroethylene was purged.

The obtained polymer solution was vacuum dried to obtain a viscous liquid. The liquid was added to 50 mL of methanol and stirred for 10 minutes, and thereafter, the precipitated solid and the supernatant were separated using a centrifuge.

Again, the obtained solid was added to 50 mL of methanol and stirred for 10 minutes, and thereafter, the solid and the supernatant were separated using a centrifuge.

The obtained liquid was vacuum dried to obtain 0.5 g of a fluorine-containing polymer.

The obtained fluorine-containing polymer was soluble in tetrahydrofuran.

Mn of the obtained polymer was 4,100, and Mw of the obtained polymer was 6,600, as measured by size exclusion chromatography, The calculated polydispersity index (Mw/Mn) of the fluorine-containing polymer was 1.6.

The fluorine content of the obtained polymer determined in the manner described above was 67% by mass.

The degree of unsaturation of the obtained polymer measured in the manner described above was 0.5 mEq/g.

Tg of the obtained polymer measured in the manner described above was 97° C.

By placing the obtained polymer on a glass substrate and heating the polymer to 180° C. under a nitrogen atmosphere, it was confirmed by visual observation that the polymer was molten and wet spread. The ratio (E*2/E*1) of the minimum value (E*2) of the complex elastic modulus of the obtained polymer in the range of from (Tg+10° C.) to 250° C. to the maximum value (E*1) of the complex elastic modulus of the obtained polymer in the range of from −50° C. to (Tg−10° C.) is considered to be 0.01 or less based on the results described above, although the viscometry could not be performed owing to the low yield.

The results of the solubility and heating tests confirmed that a fluorine-containing polymer was produced without gelation.

Example 7

In a stainless-steel autoclave equipped with a stirrer and having an internal volume of 100 mL, placed in a nitrogen-purged glove box, 2.0 g (8.0 mmol) of 1,4-divinyloctafluorobutane, 2.8 g (8.0 mmol) of 1,6-divinyldodecafluorohexane, 0.082 g (0.20 mmol) of diphenylditelluride, 0.092 g (0.40 mmol) of an azo radical initiator "V-601" (product name, FUJIFILM Wako Pure Chemical Corporation), and 100 g of 1H-perfluorohexane were introduced.

After 7.4 g (74 mmol) of tetrafluoroethylene was added under pressure, stirring was started while raising the internal temperature to 80° C. By carrying out the stirring at 200 rpm (200 rotations per minute) for 7 hours while maintaining the internal temperature, the internal pressure was reduced from 0.8 MPa (gauge pressure) to 0.6 MPa.

After cooling the autoclave with an ice-water bath, unreacted tetrafluoroethylene was purged.

The obtained polymer solution was vacuum dried to obtain a viscous liquid. The liquid was added to 50 mL of methanol and stirred for 10 minutes, and thereafter, the liquid and the supernatant were separated using a centrifuge.

Again, the obtained liquid was added to 50 mL of methanol and stirred for 10 minutes, and thereafter, the precipitated solid and the supernatant were separated using a centrifuge.

The obtained solid was vacuum dried to obtain 2.8 g of a fluorine-containing polymer.

The obtained fluorine-containing polymer was soluble in tetrahydrofuran.

Mn of the obtained polymer was 4,000, and Mw of the obtained polymer was 5,700, as measured by size exclusion chromatography.

The calculated polydispersity index (Mw/Mn) of the fluorine-containing polymer was 1.4.

The fluorine content of the obtained polymer determined in the manner described above was 66% by mass.

The degree of unsaturation of the obtained polymer measured in the manner described above was 0.3 mEq/g.

Tg of the obtained polymer measured in the manner described above was 92° C.

The ratio (E*2/E*1) of the minimum value (E*2) of the complex elastic modulus of the obtained polymer in the range of from (Tg+10° C.) to 250° C. to the maximum value (E*1) of the complex elastic modulus of the obtained polymer in the range of from −50° C. to (Tg−10° C.) is 0.01 or less, as measured in the manner described above.

The results of the measurements of the solubility and the complex elastic modulus confirmed that a fluorine-containing polymer was produced without gelation.

Example 8

In a stainless-steel autoclave equipped with a stirrer and having an internal volume of 200 mL, placed in a nitrogen-purged glove box, 2.0 g (8.0 mmol) of 1,4-divinyloctafluorobutane, 2.8 g (8.0 mmol) of 1,6-divinyldodecafluorohexane, 0.75 g (1.6 mmol) of tetraphenylphosphonium iodide, 0.14 g (0.40 mmol) of n-nonafluorobutyl iodide, and 200 g of 1H-perfluorohexane were introduced.

After 8.1 g (81 mmol) of tetrafluoroethylene was added under pressure, stirring was started while raising the internal temperature to 140° C. By carrying out the stirring at 200 rpm for 18 hours while maintaining the internal temperature, the internal pressure was reduced from 1.4 MPa to 1.3 MPa.

After cooling the autoclave with an ice-water bath, the unreacted tetrafluoroethylene was purged.

The obtained polymer solution was vacuum dried to obtain a viscous liquid. The liquid was added to 50 mL of methanol and stirred for 10 minutes, and thereafter, the liquid and the supernatant were separated using a centrifuge.

The obtained polymer solution was filtered through celite to remove solids. The filtrate was vacuum dried to obtain a viscous liquid.

The obtained liquid was added to 30 mL of methanol and stirred for 10 minutes, and thereafter, the liquid and the supernatant were separated using a centrifuge.

The obtained liquid was vacuum dried to obtain 0.9 g of a fluorine-containing polymer.

The obtained fluorine-containing polymer was soluble in tetrahydrofuran.

Mn of the obtained polymer was 2,400, and Mw of the obtained polymer was 3,500, as measured by size exclusion chromatography.

The calculated polydispersity index (Mw/Mn) of the fluorine-containing polymer was 1.5.

The fluorine content of the obtained polymer determined in the manner described above was 65% by mass.

The degree of unsaturation of the obtained polymer measured in the manner described above was 0.4 mEq/g.

Tg of the obtained polymer measured in the manner described above was 77° C.

By placing the obtained polymer on a glass substrate and heating the polymer to 180° C. under a nitrogen atmosphere, it was confirmed by visual observation that the polymer was molten and wet spread. The ratio (E*2/E*1) of the minimum value (E*2) of the complex elastic modulus of the obtained polymer in the range of from (Tg+10° C.) to 250° C. to the maximum value (E*1) of the complex elastic modulus of the obtained polymer in the range of from −50° C. to (Tg−10° C.) is considered to be 0.01 or less based on the results described above, although viscometry could not be performed owing to the low yield.

The results of the solubility and heating tests confirmed that a fluorine-containing polymer was produced without gelatin.

Example 9

In a stainless-steel autoclave equipped with a stirrer and having an internal volume of 100 mL placed in a nitrogen-purged glove box, 0.51 g (2.0 mmol) of 1,4-divinyloctafluorobutane, 0.82 g (2.0 mmol) of 1,6-divinyldodecafluorohexane, 0.13 g (0.40 mmol) of an azo radical initiator "VAm-110" (product name, FUJIFILM Wako Pure Chemical Corporation), and 100 g of 1H-perfluorohexane were introduced.

After 2.2 g (22 mmol) of tetrafluoroethylene was added under pressure, stirring was started while raising the internal temperature to 125° C. By carrying out the stirring at 200 rpm for 20 minutes while maintaining the internal temperature, the internal pressure was reduced from 0.9 MPa to 0.7 MPa.

After cooling the autoclave with an ice-water bath, unreacted tetrafluoroethylene was purged.

The obtained polymer solution was vacuum dried to obtain a viscous liquid. The liquid was added to 50 mL of methanol and stirred for 10 minutes, and thereafter, the precipitated solid and the supernatant were separated using a centrifuge.

Again, the obtained solid was added to 50 mL of methanol and stirred for 10 minutes, and thereafter, the solid and the supernatant were separated using a centrifuge.

The obtained solid was vacuum dried to obtain 0.9 g of a fluorine-containing polymer.

The obtained fluorine-containing polymer was soluble in tetrahydrofuran.

Mn of the obtained polymer was 7,900, and Mw of the obtained polymer was 12,200, as measured by size exclusion chromatography, The calculated polydispersity index (Mw/Mn) of the fluorine-containing polymer was 1.5.

The fluorine content of the obtained polymer determined in the manner described above was 68% by mass.

The degree of unsaturation of the obtained polymer measured in the manner described above was 0.2 mEq/g.

Tg of the obtained polymer measured in the manner described above was 109° C.

By placing the obtained polymer on a glass substrate and heating the polymer to 180° C. under a nitrogen atmosphere, it was confirmed by visual observation that the polymer was molten and wet spread. The ratio (E*2/E*1) of the minimum value (E*2) of the complex elastic modulus of the obtained polymer in the range of from (Tg+10° C.) to 250° C. to the maximum value (E*1) of the complex elastic modulus of the obtained polymer in the range of from −50° C. to (Tg−10° C.) is considered to be 0.01 or less based on the results described above, although viscometry could not be performed owing to the low yield.

The results of the solubility and heating tests confirmed that a fluorine-containing polymer was produced without gelation.

Example 10

In a glass vessel having an internal volume of 20 mL, 0.1 g of the fluorine-containing polymer obtained in Example 7, 0.001 g (0.004 mmol) of dicumyl peroxide, and 20 g of 1H-perfluorohexane were introduced, and the glass vessel was sealed.

Mixing was performed at room temperature for 30 minutes using a tube rotator to obtain a uniform solution.

The glass vessel was opened and dried under a stream of nitrogen at 60° C. for 12 hours to obtain a solid.

The obtained solid was placed on a glass substrate, heated under a nitrogen atmosphere at 200° C. for 1 hour, and then allowed to cool down to room temperature under the atmosphere to obtain a solid.

The obtained solid was insoluble in 1H-perfluorohexane and tetrahydrofuran.

The obtained solid did not melt by appearance when placed on a glass substrate and heated under a nitrogen atmosphere at 250° C.

The results described above demonstrated that the fluorine-containing polymer was thermosetting.

Example 11

The same procedure was carried out as in Example 10, except that the fluorine-containing polymer obtained in Example 8 was used instead of the fluorine-containing polymer obtained in Example 7, to obtain a solid.

The obtained solid was insoluble in tetrahydrofuran.

The obtained solid did not melt by appearance when placed on a glass substrate and heated under a nitrogen atmosphere at 250° C.

The results described above demonstrated that the fluorine-containing polymer was thermosetting.

Example 12

The same procedure was carried out as in Example 10, except that the fluorine-containing polymer obtained in Example 9 was used instead of the fluorine-containing polymer obtained in Example 7, to obtain a solid.

The obtained solid was insoluble in 1H-perfluorohexane and tetrahydrofuran.

The obtained solid did not melt by appearance when placed on a glass substrate and heated under a nitrogen atmosphere at 250° C.

The results described above demonstrated that the fluorine-containing polymer was thermosetting.

Example 13

In a stainless-steel autoclave equipped with a stirrer and having an internal volume of 100 mL, placed in a nitrogen-purged glove box, 5.7 g (16 mmol) of 1,6-divinyldodecafluorohexane, 0.092 g (0.40 mmol) of an azo radical initiator "V-601" (product name, FUJIFILM Wako Pure Chemical Corporation), and 100 g of 1H-perfluorohexane were introduced.

After 7.4 g (74 mmol) of tetrafluoroethylene was added under pressure, stirring was started while raising the internal temperature to 80° C. By carrying out the stirring at 200 rpm for 5 hours while maintaining the internal temperature, the internal pressure was reduced from 0.8 MPa (gauge pressure) to 0.5 MPa.

After cooling the autoclave with an ice-water bath, unreacted tetrafluoroethylene was purged.

The obtained polymer solution was vacuum dried, and a solid was obtained. The solid was added to 50 mL of methanol and stirred for 10 minutes, and thereafter, the solid and the supernatant were separated using a centrifuge.

The obtained solid was vacuum dried to obtain 3.9 g of a fluorine-containing polymer.

The fluorine-containing polymer was insoluble and unmeltable.

Example 14

In a stainless-steel autoclave equipped with a stirrer and having an internal volume of 100 mL, placed in a nitrogen-purged glove box, 5.7 g (16 mmol) of 1,6-divinyldodecafluorohexane, 0.55 g (1.6 mmol) of n-nonafluorobutyl iodide, 0.092 g (0.40 mmol) of an azo radical initiator "V-601" (product name, FUJIFILM Wako Pure Chemical Corporation), and 100 g 1H-perfluorohexane were introduced.

After 7.4 g (74 mmol) of tetrafluoroethylene was added under pressure, stirring was started while raising the internal temperature to 80° C. By carrying out the stirring at 200 rpm for 7 hours while maintaining the internal temperature, the internal pressure was reduced from 0.8 MPa (gauge pressure) to 0.5 MPa.

After cooling the autoclave with an ice-water bath, unreacted tetrafluoroethylene was purged.

The obtained polymer solution was vacuum dried, and a solid was obtained. The solid was added to 50 mL of methanol and stirred for 10 minutes, and thereafter, the solid and the supernatant were separated using a centrifuge.

The obtained solid was vacuum dried to obtain 4.1 g of a fluorine-containing polymer.

The fluorine-containing polymer was insoluble and unmeltable.

The present disclosure also includes the following aspects.

<1> A fluorine-containing polymer, having a fluorine content of 50% by mass or more, a degree of unsaturation of 0.4 mEq/g or more, and a glass transition temperature of −20° C. or higher,
wherein a relationship between a maximum value E*1 of a complex elastic modulus in a range of from −50° C. to the glass transition temperature and a minimum value E*2 of the complex elastic modulus in a range of from the glass transition temperature to 250° C. satisfies the following inequality: E*2/E*1≤0.01.

<2> The fluorine-containing polymer according to <1>, having a polydispersity index of 2.0 or less.

<3> The fluorine-containing polymer according to <1> or <2>, having a weight average molecular weight of from 1,000 to 1,000,000.

<4> The fluorine-containing polymer according to any one of <1> to <3>, which is:

a polymer of a compound represented by the following Formula (1); or a copolymer of the compound represented by the following Formula (1) and a compound that has a reactive carbon-carbon double bond and that is different from the compound represented by Formula (1):

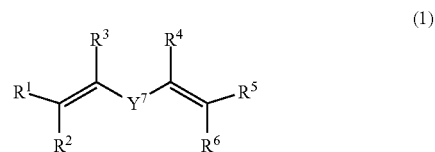

(1)

wherein, in Formula (1):
$Y^7$ represents a divalent organic group having at least one fluorine atom,
each of $R^1$ to $R^6$ independently represents a hydrogen atom, a fluorine atom, a chlorine atom, a bromine atom, an iodine atom, or an organic group having 1 to 5 carbon atoms, and
each of $R^1$ and $R^3$, $R^4$ and $R^5$, $R^2$ and $Y^7$, and $R^6$ and $Y^7$ may be independently linked to each other to form a ring structure.

<5> The fluorine-containing polymer according to <4>, wherein a fluorine content of the compound represented by Formula (1) is 20% by mass or more.

<6> The fluorine-containing polymer according to <4> or <5>, wherein $Y^7$ in Formula (1) is a fluoroalkylene group having from 1 to 60 carbon atoms, a fluoropolyether group having from 1 to 60 carbon atoms, or a fluoroarylene group having from 1 to 60 carbon atoms.

<7> The fluorine-containing polymer according to any one of <4> to <6>, wherein the compound represented by Formula (1) includes at least one selected from the group consisting of a divinylfluoroalkane having from 5 to 64 carbon atoms, a divinylfluoropolyether having from 5 to 64 carbon atoms, and a divinylfluoroarylene having from 5 to 64 carbon atoms.

<8> A method of producing the fluorine-containing polymer according to any one of <1> to <7>, the method including polymerizing compounds having at least two reactive carbon-carbon double bonds:
in the presence of an ionic catalyst represented by the following Formula (2), which includes an anion and a counter cation, and a compound having a partial structure represented by the following Formula (3), or
in the presence of at least one compound selected from the group consisting of a compound represented by the following Formula (4) and a compound represented by the following Formula (5):

wherein, in Formula (2):
$A^+$ represents a cation including at least one element selected from the group consisting of nitrogen and phosphorus, an alkali metal ion, or a proton, and
$B^-$ represents a monovalent anion including at least one element selected from the group consisting of iodine, nitrogen, and sulfur:

(3)

wherein, in Formula (3):
* represents a bonding site that is bonded to an organic group, and
each of $X^1$ and $X^2$ independently represents a hydrogen atom, a fluorine atom, a chlorine atom, or $—CX^3X^4X^5$, wherein each of $X^3$ to $X^5$ independently represents a hydrogen atom, a fluorine atom, or a chlorine atom:

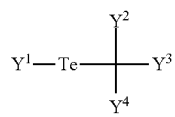
(4)

wherein, in Formula (4):
$Y^1$ represents an unsubstituted alkyl group having from 1 to 8 carbon atoms, a substituted alkyl group having from 1 to 8 carbon atoms, an unsubstituted aryl group having from 3 to 12 carbon atoms, or a substituted aryl group having from 3 to 16 carbon atoms,
each of $Y^2$ and $Y^3$ independently represents a hydrogen atom, or a substituted or unsubstituted alkyl group having from 1 to 8 carbon atoms, and
$Y^4$ represents a hydrogen atom, an unsubstituted alkyl group having from 1 to 8 carbon atoms, a substituted alkyl group having from 1 to 8 carbon atoms, an unsubstituted aryl group having from 3 to 12 carbon atoms, a substituted aryl group having from 3 to 16 carbon atoms, an acyl group having from 2 to 8 carbon atoms, an amide group having from 2 to 8 carbon atoms, an oxycarbonyl group, or a cyano group:

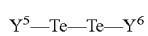
(5)

wherein, in Formula (5):
each of $Y^5$ and $Y^6$ independently represents an unsubstituted alkyl group having from 1 to 8 carbon atoms, a substituted alkyl group having from 1 to 8 carbon atoms, an unsubstituted aryl group having from 3 to 12 carbon atoms, or a substituted aryl group having from 3 to 16 carbon atoms.

<9> The method of producing a fluorine-containing polymer according to <8>, wherein the compound having at least two reactive carbon-carbon double bonds includes a compound represented by the following Formula (1):

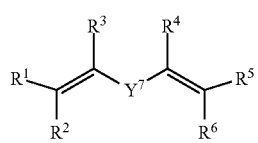
(1)

wherein, in Formula (1):
$Y^7$ represents a divalent organic group having at least one fluorine atom,
each of $R^1$ to $R^6$ independently represents a hydrogen atom, a fluorine atom, a chlorine atom, a bromine atom, an iodine atom, or an organic group having from 1 to 5 carbon atoms, and
each of $R^1$ and $R^3$, $R^4$ and $R^1$, $R^2$ and $Y^7$, and $R^6$ and $Y^7$ may be independently linked to each other to form a ring structure.

<10> The method of producing a fluorine-containing polymer according to <9>, the method including copolymerizing the compound represented by Formula (1) and a compound that has a reactive carbon-carbon double bond and that is different from the compound represented by Formula (1).

The disclosures of Japanese Patent Application No. 2020-023636 and Japanese Patent Application No. 2020-087582 are hereby incorporated by reference in their entirety.

All documents, patent applications, and technical standards described herein are incorporated herein by reference to the same extent as if the individual documents, patent applications, and technical standards were specifically and individually incorporated by reference.

The invention claimed is:

1. A fluorine-containing polymer, having a fluorine content of 50% by mass or more, a degree of unsaturation of 0.1 mEq/g or more, and a glass transition temperature of −20° C. or higher,
wherein:
a relationship between a maximum value $E^*1$ of a complex elastic modulus in a range of from −50° C. to (glass transition temperature −10° C.) and a minimum value $E^*2$ of the complex elastic modulus in a range of from (glass transition temperature +10° C.) to 250° C. satisfies the following inequality: $E^*2/E^*1 \leq 0.01$,
the fluorine-containing polymer is a polymer of a compound of Formula (1) or a copolymer of the compound of Formula (1) and a compound having a reactive carbon-carbon double bond and that is different from the compound of Formula (1);

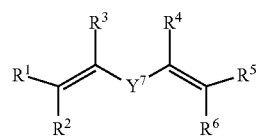
(1)

where $Y^7$ represents a divalent organic group having at least one fluorine atom, each of $R^1$ to $R^6$ independently represents a hydrogen atom, a fluorine atom, a chlorine atom, a bromine atom, an iodine atom, or an organic group having 1 to 5 carbon atoms, each of $R^1$ and $R^3$, $R^4$ and $R^5$, $R^2$ and $Y^7$, and $R^6$ and $Y^7$ may be independently linked to each other to form a ring structure, and
a fluorine content of the compound of Formula (1) is 20% by mass or more.

2. The fluorine-containing polymer according to claim 1, having a polydispersity index of 2.0 or less.

3. The fluorine-containing polymer according to claim 1, having a weight average molecular weight of from 1,000 to 1,000,000.

4. The fluorine-containing polymer according to claim 1, wherein $Y^7$ in Formula (1) is a fluoroalkylene group having from 1 to 60 carbon atoms, a fluoropolyether group having from 1 to 60 carbon atoms, or a fluoroarylene group having from 1 to 60 carbon atoms.

5. The fluorine-containing polymer according to claim 1, wherein the compound represented by Formula (1) comprises at least one selected from the group consisting of a divinylfluoroalkane having from 5 to 64 carbon atoms, a divinylfluoropolyether having from 5 to 64 carbon atoms, and a divinylfluoroarylene having from 5 to 64 carbon atoms.

6. A method of producing the fluorine-containing polymer according to claim 1, the method comprising:

polymerizing a compound having at least two reactive carbon-carbon double bonds:

$Y^1$ represents an unsubstituted alkyl group having from 1 to 8 carbon atoms, a substituted alkyl group having from 1 to 8 carbon atoms, an unsubstituted aryl group having from 3 to 12 carbon atoms, or a substituted aryl group having from 3 to 16 carbon atoms, each of $Y^2$ and $Y^3$ independently represents a hydrogen atom, or a substituted or unsubstituted alkyl group having from 1 to 8 carbon atoms, and $Y^4$ represents a hydrogen atom, an unsubstituted alkyl group having from 1 to 8 carbon atoms, a substituted alkyl group having from 1 to 8 carbon atoms, an unsubstituted aryl group having from 3 to 12 carbon atoms, a substituted aryl group having from 3 to 16 carbon atoms, an acyl group having from 2 to 8 carbon atoms, an amide group having from 2 to 8 carbon atoms, an oxycarbonyl group, or a cyano group:

  (5)

wherein, in Formula (5):

each of $Y^5$ and $Y^6$ independently represents an unsubstituted alkyl group having from 1 to 8 carbon atoms, a substituted alkyl group having from 1 to 8 carbon atoms, an unsubstituted aryl group having from 3 to 12 carbon atoms, or a substituted aryl group having from 3 to 16 carbon atoms, wherein the compound having at least two reactive carbon-carbon double bonds includes a compound represented by the following Formula (1):

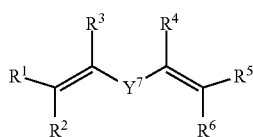  (1)

wherein, in Formula (1):

$Y^7$ represents a divalent organic group having at least one fluorine atom, in the presence of an ionic catalyst represented by the following Formula (2), which comprises an anion and a counter cation, and a compound having a partial structure represented by the following Formula (3), or in the presence of at least one compound selected from the group consisting of a compound represented by the following Formula (4) and a compound represented by the following Formula (5):

  (2)

wherein, in Formula (2):

$A^+$ represents a cation including at least one element selected from the group consisting of nitrogen and phosphorus, an alkali metal ion, or a proton, and $B^-$ represents a monovalent anion including at least one element selected from the group consisting of iodine, nitrogen, and sulfur:

  (3)

wherein, in Formula (3):

* represents a bonding site that is bonded to an organic group, and each of $X^1$ and $X^2$ independently represents a hydrogen atom, a fluorine atom, a chlorine atom, or $-CX^3X^4X^5$, wherein each of $X^3$ to $X^5$ independently represents a hydrogen atom, a fluorine atom, or a chlorine atom:

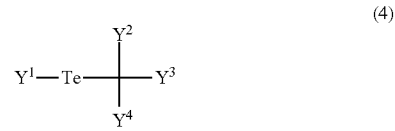  (4)

wherein, in Formula (4):

each of $R^1$ to $R^6$ independently represents a hydrogen atom, a fluorine atom, a chlorine atom, a bromine atom, an iodine atom, or an organic group having from 1 to 5 carbon atoms, and each of $R^1$ and $R^3$, $R^4$ and $R^5$, $R^2$ and $Y^7$, and $R^6$ and $Y^7$ may be independently linked to each other to form a ring structure.

7. The method of producing a fluorine-containing polymer according to claim 6, the method comprising copolymerizing the compound represented by Formula (1) and a compound that has a reactive carbon-carbon double bond and that is different from the compound represented by Formula (1).

* * * * *